US008934172B2

(12) United States Patent
Goto et al.

(10) Patent No.: US 8,934,172 B2
(45) Date of Patent: Jan. 13, 2015

(54) MIRROR

(75) Inventors: Hayato Goto, Kanagawa (JP); Kouichi Ichimura, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/541,812

(22) Filed: Jul. 5, 2012

(65) Prior Publication Data
US 2012/0268824 A1 Oct. 25, 2012

Related U.S. Application Data

(63) Continuation of application No. PCT/JP2010/054587, filed on Mar. 17, 2010.

(51) Int. Cl.
G02B 1/10 (2006.01)
G02B 5/08 (2006.01)

(52) U.S. Cl.
CPC .................................... *G02B 5/0816* (2013.01)
USPC ............................ 359/584; 359/586; 359/588

(58) Field of Classification Search
CPC .. G02B 5/0816; G02B 5/0825; G02B 5/0833; G02B 5/0883; G02B 5/28; G02B 5/285; G02B 5/289
USPC .................................. 359/359, 577–590, 838
See application file for complete search history.

(56) References Cited

U.S. PATENT DOCUMENTS 4,128,303 A * 12/1978 Onoki et al. ................... 359/588
5,258,872 A 11/1993 Johnson et al.
5,879,820 A * 3/1999 Quesnel et al. ............... 428/688

2005/0063451 A1 3/2005 Abe et al.
2008/0088932 A1* 4/2008 Cho et al. ..................... 359/586
2009/0025783 A1* 1/2009 Wernham et al. ............. 136/256

FOREIGN PATENT DOCUMENTS

JP 2-287301 11/1990
JP 2003-270432 9/2003
JP 2008-64976 3/2008

OTHER PUBLICATIONS

Office Action issued Oct. 30, 2013 in Japanese Patent Application No. 2012-505373 with English language translation.
Office Action issued Mar. 11, 2014 in Japanese Patent Application No. 2012-505373 with English language translation.
(Continued)

*Primary Examiner* — Stephone B Allen
*Assistant Examiner* — Kimberly N Kakalec
(74) *Attorney, Agent, or Firm* — Oblon, Spivak, McClelland, Maier & Neustadt, L.L.P.

(57) ABSTRACT

According to one embodiment, a mirror includes a plurality of dielectric layers stacked in a first direction. A thickness along the first direction of each of the dielectric layers is half a design wavelength. The dielectric layers include a first dielectric layer. The first dielectric layer includes a first portion with a thickness being ⅛ of the design wavelength, a second portion stacked with the first portion with a thickness being ⅛ of the design wavelength, and a third portion provided between the first and second portions with a thickness being ¼ of the design wavelength. The second portion has a refractive index lower than that of the first portion. The third portion has a refractive index gradually decreasing from a side of the first portion toward a side of the second portion.

21 Claims, 14 Drawing Sheets

(56) References Cited

OTHER PUBLICATIONS

International Search Report issued on Apr. 27, 2010 for PCT/JP2010/054587 filed on Mar. 17, 2010 with English Translation of Categories.

International Written Opinion issued on Apr. 27, 2010 for PCT/JP2010/054587 filed on Mar. 17, 2010.

O. Arnon et al.; Applied Optics; "Electric field distribution and the reduction of laser damage in multilayers"; vol. 19, No. 11, pp. 1853-1855, Jun. 1, 1980.

* cited by examiner

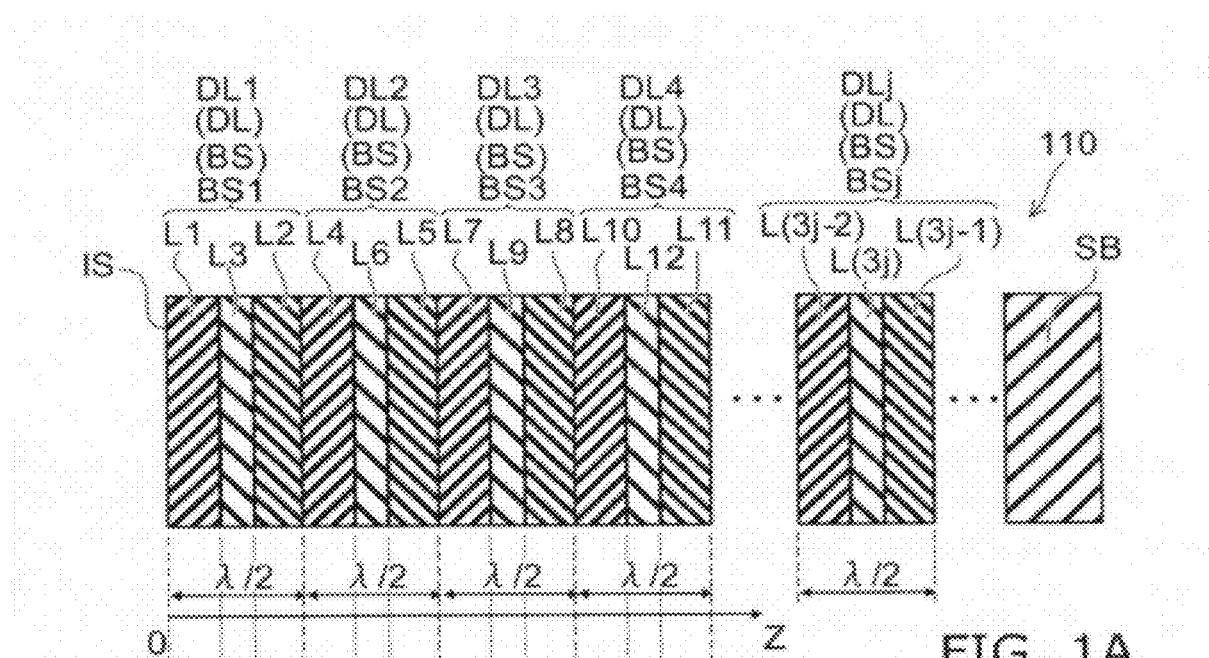
FIG. 1A
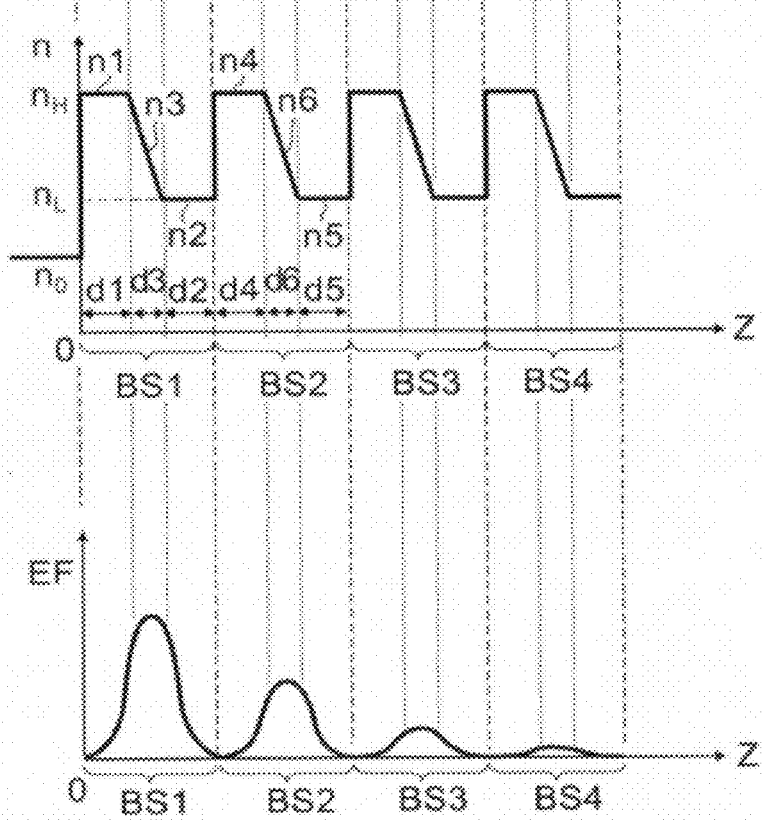
FIG. 1B
FIG. 1C

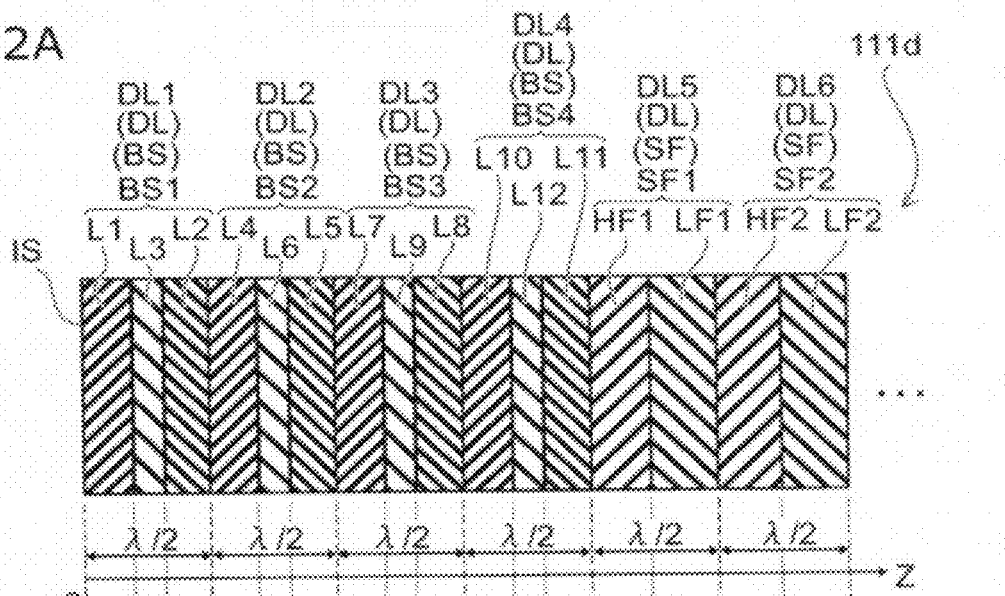
FIG. 2A
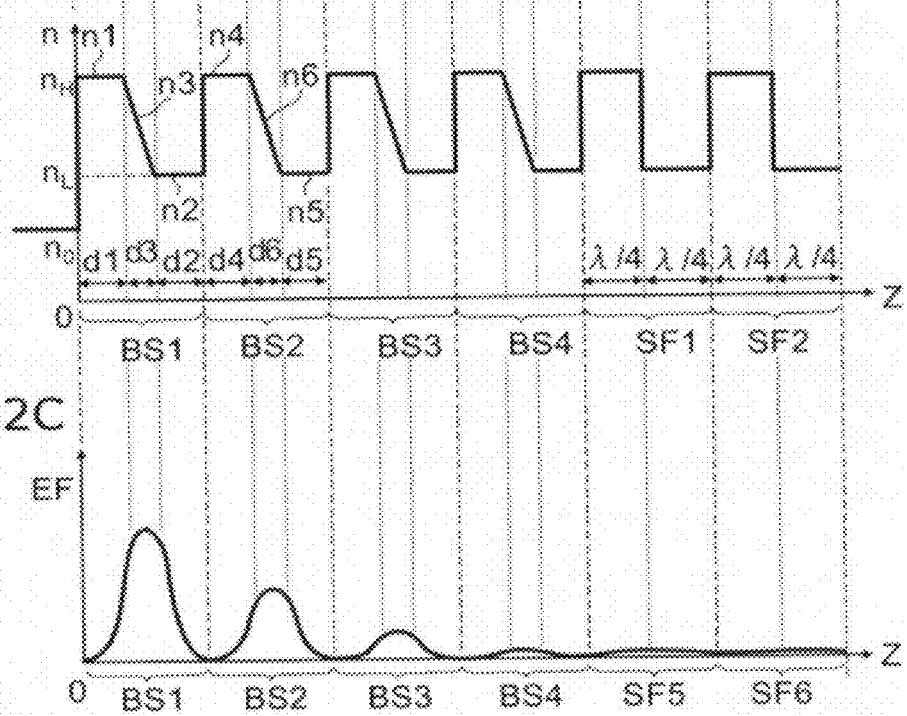
FIG. 2B
FIG. 2C

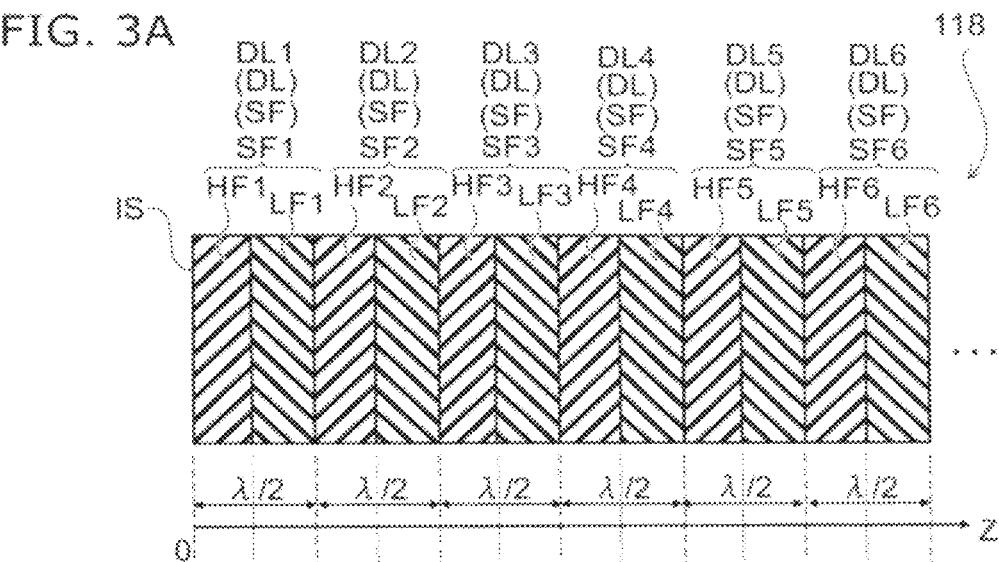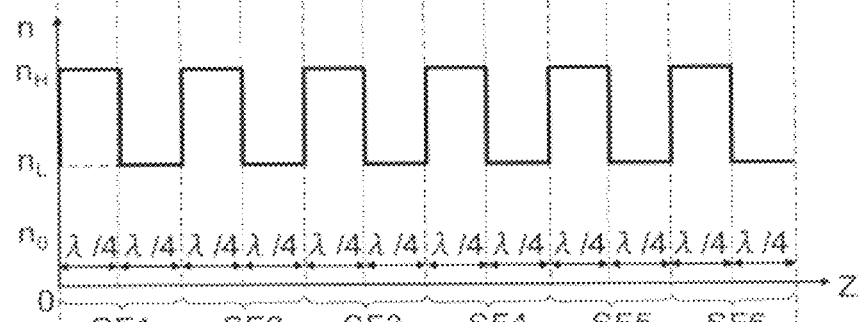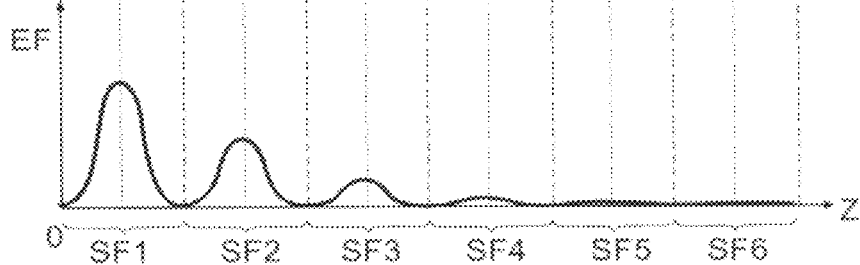

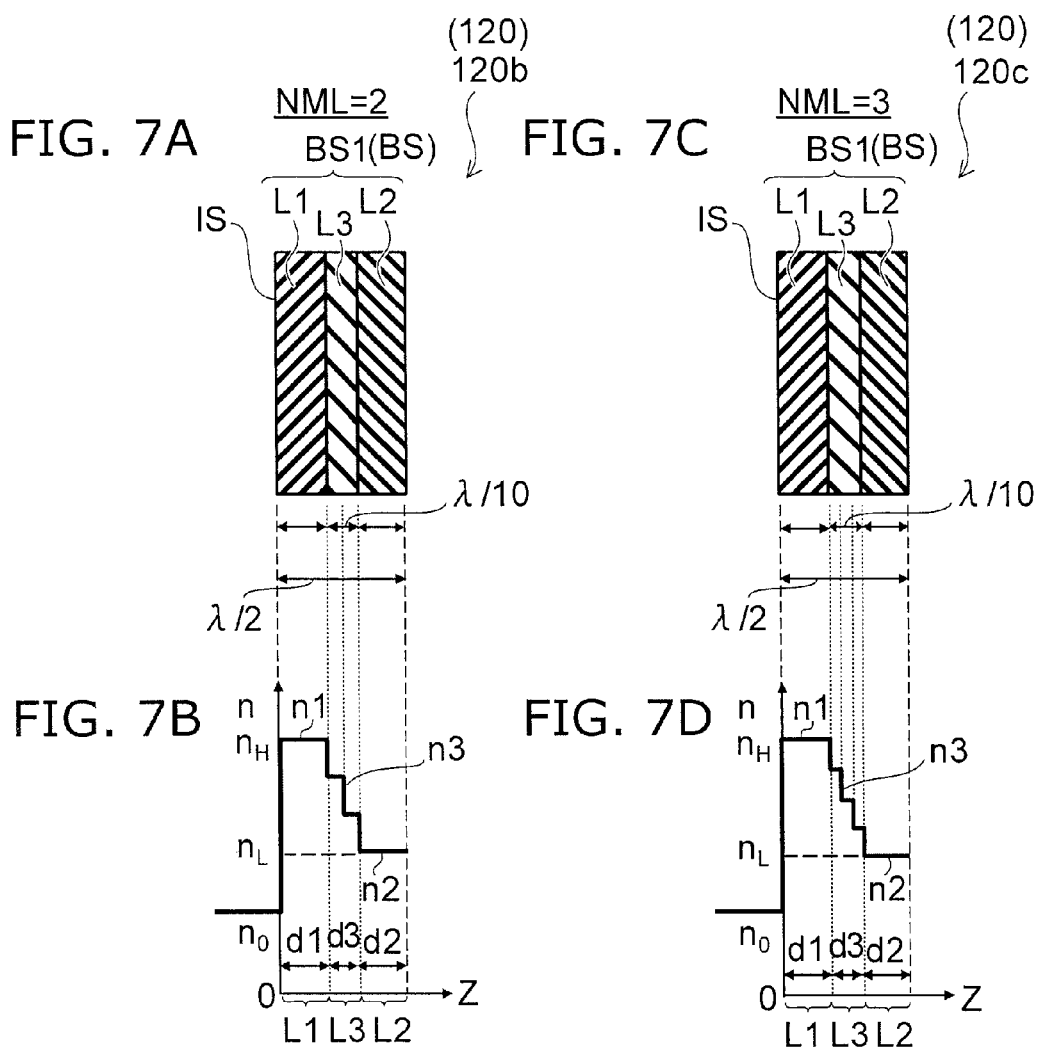

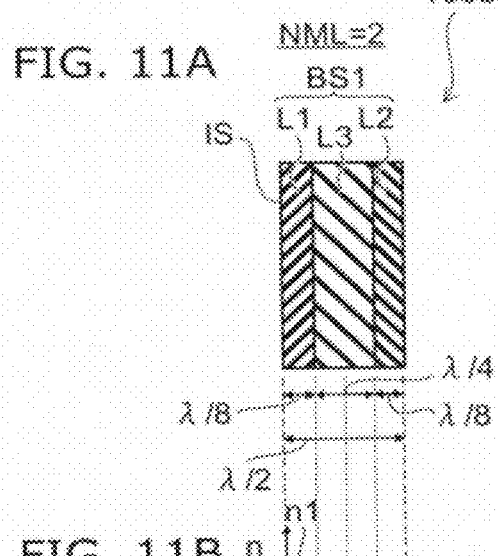
FIG. 11A
FIG. 11B
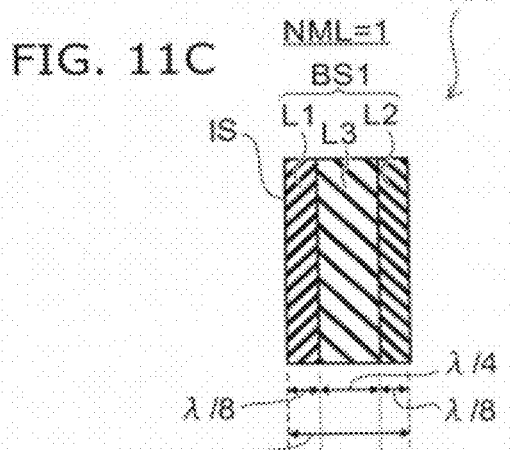
FIG. 11C
FIG. 11D

MIRROR

CROSS-REFERENCE TO RELATED APPLICATIONS

This is a continuation application of International Application PCT/JP2010/054587, filed on Mar. 17, 2010; the entire contents of which are incorporated herein by reference.

FIELD

Embodiments described herein relate generally to a mirror.

BACKGROUND

Realization of low-loss high-reflection mirrors is desired to increase the performance of interferometry and laser gyro and to realize quantum computers based on cavity quantum electrodynamics.

As a mirror, there is known a configuration of stacking a plurality of pairs of a high refractive index layer and a low refractive index layer. Non-Patent Document 1 proposes a configuration of stacking a plurality of layers having a continuously changed refractive index to suppress loss due to scattering at the interface between the high refractive index layer and the low refractive index layer.

In this configuration, the electric field is nearly zero in the portion where the refractive index discontinuously increases. In the entire region except the boundary where the refractive index is discontinuous, the refractive index continuously changes, and the refractive index difference is small. Hence, it is considered that the interface scattering loss is suppressed as compared with the configuration of stacking a plurality of pairs of a high refractive index layer and a low refractive index layer. However, in this configuration, the reflectance is likely to decrease. Thus, it is difficult to realize low loss and high reflection at the same time.

BRIEF DESCRIPTION OF THE DRAWINGS

FIG. 1A to FIG. 1C are schematic views showing a mirror;
FIG. 2A to FIG. 2C are schematic views showing a mirror;
FIG. 3A to FIG. 3C are schematic views showing a mirror of a comparative example;
FIG. 7A to FIG. 7D are schematic views showing mirrors;
FIG. 11A to FIG. 11D are schematic views showing mirrors of a comparative example.

DETAILED DESCRIPTION

Figure 4A:
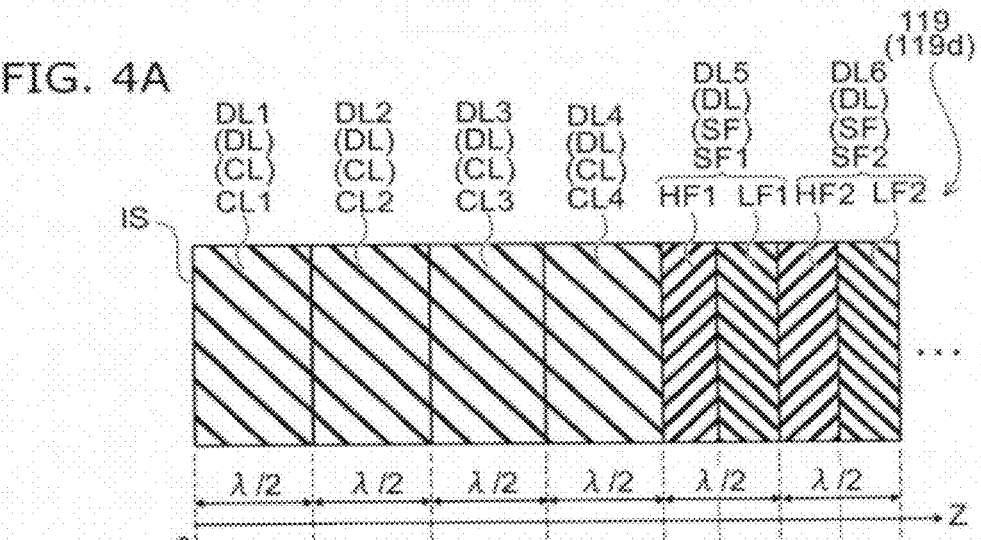
FIG. 4A to FIG. 4C are schematic views showing a mirror of a comparative example.

According to one embodiment, a mirror includes a plurality of dielectric layers stacked in a first direction. A thickness along the first direction of each of the dielectric layers is a length of half a design wavelength. The dielectric layers include a first dielectric layer. The first dielectric layer includes a first portion, a second portion and a third portion. The first portion has a first portion refractive index. A thickness of the first portion along the first direction is 1/8 of the design wavelength. The second portion is stacked with the first portion in the first direction. The second portion has a second portion refractive index lower than the first portion refractive index. A thickness of the second portion along the first direction is 1/8 of the design wavelength. The third portion is provided between the first portion and the second portion. The third portion has a third portion refractive index gradually decreasing from a side of the first portion toward a side of the second portion. A thickness of the third portion along the first direction is 1/4 of the design wavelength. A variance of the third portion refractive index with respect to the first direction is larger than a variance of the first portion refractive index with respect to the first direction and is larger than a variance of the second portion refractive index with respect to the first direction.

Various embodiments will be described hereinafter in detail with reference to the accompanying drawings.

The drawings are schematic or conceptual. The relationship between the thickness and the width of each portion, and the size ratio between the portions, for instance, are not necessarily identical to those in reality. Furthermore, the same portion may be shown with different dimensions or ratios depending on the figures.

In the present specification and the drawings, components similar to those described previously with reference to earlier figures are labeled with like reference numerals, and the detailed description thereof is omitted appropriately.

FIG. 1A, FIG. 1B, and FIG. 1C are schematic views illustrating the configuration of a mirror according to an embodiment.

More specifically, FIG. 1A is a schematic sectional view of the mirror 110 according to the embodiment. FIG. 1B is a graph illustrating the characteristics of the mirror 110. The horizontal axis represents position, and the vertical axis represents refractive index n. FIG. 1C is a graph illustrating the characteristics of the mirror 110. The horizontal axis represents position, and the vertical axis represents electric field EF. The electric field EF is the absolute value square of the electric field amplitude.

As shown in FIG. 1A, the mirror 110 according to the embodiment includes a plurality of dielectric layers DL mutually stacked in a first direction.

The mirror 110 may be either a plane mirror or a curved mirror. For instance, the mirror 110 may be a spherical or cylindrical curved mirror. In this case, the dielectric layers DL are stacked along the direction perpendicular to the curved surface at each position of the curved surface. More specifically, for a plane mirror, the first direction is the direction perpendicular to its plane. For a curved mirror, the first direction is the direction perpendicular to its curved surface at each position of the curved surface. In the following, for simplicity of description, it is assumed that the mirror 110 is a plane mirror.

Here, the stacking direction (first direction) is defined as Z-axis direction.

The thickness along the first direction of each of the plurality of dielectric layers DL is a half length of the design wavelength. Here, the design wavelength is the wavelength of light reflected by the mirror 110 according to the embodiment. In the following, the design wavelength is denoted by λ.

One of the plurality of dielectric layers DL includes a first portion with the thickness along the first direction being ⅛ of the design wavelength, a second portion stacked with the first portion in the first direction with the thickness along the first direction being ⅛ of the design wavelength, and a third portion provided between the first portion and the second portion. The thickness along the first direction of the third portion is ¼ of the design wavelength.

In the description, the "thickness" refers to the optical thickness (optical distance). The optical thickness refers to the value of the physical thickness multiplied by the refractive index of the medium. In the case where the refractive index changes in the thickness direction of the medium, the value of the physical thickness multiplied by the refractive index of the medium is integrated along the thickness direction of the medium, and the integrated value is used as the "thickness" (optical thickness).

In the description, the term "stacked" includes not only the case where two layers are stacked in contact with each other, but also the case where two layers are stacked with another layer interposed between the two layers. In the specific example, a second film L2 is stacked with a first film L1 with a third film L3 interposed between the first film L1 and the second film L2. In the description, in the expression such as "stacked" and "being stacked", the order of forming a plurality of layers is arbitrary.

The first portion has a first portion refractive index (in the specific example, high refractive index $n_H$). The second portion has a second portion refractive index (in the specific example, low refractive index $n_L$) lower than the first portion refractive index. The third portion has a third portion refractive index gradually decreasing from the first portion side toward the second portion side. Furthermore, the variance of the third portion refractive index with respect to the first direction is larger than the variance of the first portion refractive index with respect to the first direction and the variance of the second portion refractive index with respect to the first direction. Here, the "variance" does not mean the wavelength dependence of the refractive index, i.e., dispersion, but refers to the variance in the statistical sense (the mean of the squared differences from the mean).

That is, the refractive index change along the thickness direction is larger in the third portion in the center portion of the dielectric layer DL than in the first portion and the second portion near the side face of the dielectric layer DL. The refractive index of the third portion gradually decreases from the first portion toward the second portion.

Thus, a low-loss high-reflection mirror is achieved.

In the following, the mirror according to the embodiment is described with reference to an example in which one of the plurality of dielectric layers DL has a triple-layer structure as follows.

As shown in FIG. 1A, in the mirror 110, one of the plurality of dielectric layers DL includes a first triple-layer structural body BS1.

The first triple-layer structural body BS1 includes the first film L1 of dielectric, the second film L2 of dielectric, and the third film L3 of dielectric.

The first film L1 has a first thickness d1 larger than ⅛ of the design wavelength and smaller than ¼ of the design wavelength. That is, the first thickness d1 is larger than λ/8 and smaller than λ/4.

The first film L1 has a first refractive index n1. As shown in FIG. 1B, the first refractive index n1 is e.g. the high refractive index $n_H$. The first film L1 is a thin film made of a dielectric, having a substantially uniform refractive index.

The second film L2 is stacked with the first film L1 in the first direction.

The second film L2 has a second thickness d2 larger than ⅛ of the design wavelength and smaller than ¼ of the design wavelength. That is, the second thickness d2 is larger than λ/8 and smaller than λ/4.

The second film L2 has a second refractive index n2 lower than the first refractive index n1. As shown in FIG. 1B, the second refractive index n2 is e.g. the low refractive index $n_L$. The second film L2 is a thin film made of a dielectric, having a substantially uniform refractive index.

The third film L3 is provided between the first film L1 and the second film L2. The third film L3 has a third thickness d3. The third thickness d3 is obtained by subtracting the sum of the first thickness d1 and the second thickness d2 from the value of half the design wavelength. That is, the third thickness d3 is λ/2−(d1+d2). Depending on the values of the first thickness d1 and the second thickness d2, the third thickness d3 can range from a value larger than zero to the value of λ/4. Here, the thickness of the first triple-layer structural body BS1 (the sum of the first thickness d1, the second thickness d2, and the third thickness d3) is λ/2.

As shown in FIG. 1B, the third film L3 has a third refractive index n3 gradually decreasing from the first film L1 side toward the second film L2 side. For instance, from the first film L1 side toward the second film L2 side, the third refractive index n3 gradually decreases from the high refractive index $n_H$ (first refractive index n1) toward the low refractive index $n_L$ (second refractive index n2). The third film L3 is a thin film made of a dielectric, having a refractive index changing along the thickness direction.

Here, the refractive indices of the first film L1 and the thin film L2 are each substantially uniform. The refractive index change in each of these layers is sufficiently smaller than the refractive index change in the third film L3.

The stacking direction of the first film L1, the second film L2, and the third film L3 is the first direction (Z-axis direction). Here, the direction from the first film L1 toward the second film L2 is defined as the positive direction of the Z axis.

In the mirror 110 according to the embodiment, the surface of the first film L1 on the opposite side from the third film L3 serves as an incident surface IS. That is, by the mirror 110, the light incident on the incident surface IS from the outside is reflected toward the outside.

As illustrated in FIGS. 1A to 1C, the mirror 110 of the specific example can be provided on the major surface of a substrate SB (substrate body).

Thus, in the mirror 110 according to the embodiment, one of the plurality of dielectric layers DL includes the first triple-layer structural body BS1. As described above, the first triple-layer structural body BS1 includes the first film L1 having a high refractive index, the second film L2 having a low refractive index lower than the high refractive index, and the third film L3 provided therebetween and having a gradually decreasing refractive index. Thus, the mirror 110 according to the embodiment can provide a low-loss high-reflection mirror capable of suppressing the interface scattering loss while maintaining high reflectance.

More specifically, as shown in FIG. 1C, in the first triple-layer structural body BS1, the electric field EF is high in the center portion in the thickness direction. The electric field EF is low at both ends in the thickness direction of the first triple-layer structural body BS1. In the mirror 110, in the region of high electric field EF, the refractive index gradually decreases, and the refractive index difference is small. The interface scattering loss becomes lower as the refractive index difference of the media on both sides of the interface becomes smaller. Hence, in the third film L3 placed in the region of high electric field EF, the interface scattering loss is suppressed. Furthermore, because the decrease of refractive index is large in the region of high electric field EF, the reflectance can be maintained at a high value. Thus, the mirror 110 according to the embodiment can provide a low-loss high-reflection mirror.

In the mirror 110, of the plurality of dielectric layers DL, the dielectric layer DL including the first triple-layer structural body BS1 is placed at the end in the direction from the second film L2 toward the first film L1 (the end in the negative direction of the Z axis). That is, the dielectric layer DL including the first triple-layer structural body BS1 is placed at one end of the plurality of dielectric layers DL. The second film L2 is placed between the first film L1 and the plurality of dielectric layers DL except the dielectric layer DL including the first triple-layer structural body BS1. In other words, the second film L2 is placed between the third film L3 and the plurality of dielectric layers DL except the dielectric layer DL including the first triple-layer structural body BS1. Of the plurality of dielectric layers DL, the dielectric layer DL of the first triple-layer structural body BS1 is placed at the end on the incident surface IS side of the mirror 110. This can optimize high reflectance and low loss.

Furthermore, as shown in FIG. 1A, in the mirror 110 according to the embodiment, a dielectric layer DL of the plurality of dielectric layers DL different from the dielectric layer DL including the first triple-layer structural body BS1 can include a second triple-layer structural body BS2.

In the specific example, the second triple-layer structural body BS2 is provided on the second film L2 side of the first triple-layer structural body BS1. That is, the second triple-layer structural body BS2 is provided on the opposite side of the first triple-layer structural body BS1 from the incident surface IS (the incident surface IS of the mirror 110).

The second triple-layer structural body BS2 includes a fourth film L4 of dielectric, a fifth film L5 of dielectric, and a sixth film L6 of dielectric.

The second film L2 is disposed between the first film L1 and the fifth film L5. The fourth film L4 is disposed between the second film L2 and the fifth film L5. The sixth film L6 is disposed between the fourth film L4 and the fifth film L5.

In other words, the fourth film L4 is provided on the opposite side of the second film L2 from the third film L3. The fourth film L4 has a fourth thickness d4 larger than ⅛ of the design wavelength and smaller than ¼ of the design wavelength. That is, the fourth thickness d4 is larger than $\lambda/8$ and smaller than $\lambda/4$.

The fourth film L4 has a fourth refractive index n4. As shown in FIG. 1B, in the specific example, the fourth refractive index n4 is the high refractive index $n_H$. The fourth film L4 is a thin film made of a dielectric, having a substantially uniform refractive index.

The fifth film L5 is provided on the opposite side of the fourth film L4 from the second film L2. The fifth film L5 has a fifth thickness d5 larger than ⅛ of the design wavelength and smaller than ¼ of the design wavelength. That is, the fifth thickness d5 is larger than $\lambda/8$ and smaller than $\lambda/4$.

The fifth film L5 has a fifth refractive index n5 lower than the fourth refractive index n4. As shown in FIG. 1B, in the specific example, the fifth refractive index n5 is the low refractive index $n_L$. The fifth film L5 is a thin film made of a dielectric, having a substantially uniform refractive index.

The sixth film L6 is provided between the fourth film L4 and the fifth film L5. The sixth film L6 has a sixth thickness d6. The sixth thickness d6 is obtained by subtracting the sum of the fourth thickness d4 and the fifth thickness d5 from half the design wavelength. That is, the sixth thickness d6 is $\lambda/2-(d4+d5)$. Depending on the values of the fourth thickness d4 and the fifth thickness d5, the sixth thickness d6 can range from a value larger than zero to the value of $\lambda/4$. Here, the thickness of the second triple-layer structural body BS2 (the sum of the fourth thickness d4, the fifth thickness d5, and the sixth thickness d6) is $\lambda/2$. The sixth film L6 is a thin film made of a dielectric, having a refractive index changing along the thickness direction.

Here, the refractive indices of the fourth film L4 and the fifth film L5 are each substantially uniform. The refractive index change in each of these layers is sufficiently smaller than the refractive index change in the sixth film L6.

As shown in FIG. 1B, the sixth film L6 has a sixth refractive index n6 gradually decreasing from the fourth film L4 side toward the fifth film L5 side. For instance, from the fourth film L4 side toward the fifth film L5 side, the sixth refractive index n6 gradually decreases from the high refractive index $n_H$ (fourth refractive index n4) toward the low refractive index $n_L$ (fifth refractive index n5).

As described above, in the specific example, the fourth refractive index n4 is equal to the first refractive index n1, and the fifth refractive index n5 is equal to the second refractive index n2. However, in the embodiment, the second refractive index n2 only needs to be lower than the first refractive index n1, and the fifth refractive index n5 only needs to be lower than the fourth refractive index n4. The relationship between the first refractive index n1 and the fourth refractive index n4, and the relationship between the second refractive index n2 and the fifth refractive index n5, are each arbitrary.

Thus, the mirror 110 includes a plurality of dielectric layers DL. More than one of the plurality of dielectric layers DL can be triple-layer structural bodies as described above.

For instance, the mirror 110 includes K (K is an integer of 1 or more) dielectric layers DL. Counting from the incident surface, the j-th (j is an integer of 1 or more and N or less) dielectric layer DLj is configured as a triple-layer structural body BSj. The triple-layer structural body BSj includes a film L(3j−2) of dielectric having a high refractive index, a film L(3j−1) of dielectric having a low refractive index lower than the high refractive index, and a film L(3j) of dielectric provided therebetween and having a gradually decreasing refractive index. Here, the number K of dielectric layers DL is determined from the design value of the reflectance required for the mirror 110. As K becomes larger, the reflectance of the mirror 110 becomes higher.

In the mirror 110 according to the embodiment, one or more of the plurality of dielectric layers DL are triple-layer structural bodies BS. The number of triple-layer structural bodies BS is denoted by N (N is an integer of 1 or more and K or less).

In each triple-layer structural body BS, the refractive index changes (gradually decreases) in the center portion (film L(3j)) in the thickness direction. The refractive index is substantially constant in the layers at both ends in the thickness direction of the triple-layer structural body BS (the film L(3j−2) having a high refractive index and the film L(3j−1) having a low refractive index).

As shown in FIG. 1C, in each triple-layer structural body BS, the electric field EF is high in the center portion in the thickness direction. The electric field EF is low at both ends in the thickness direction of the triple-layer structural body BS.

In the mirror 110, in the region of high electric field EF, the film L(3j) having a gradually decreasing refractive index (such as third film L3 and sixth film L6) is placed. In the region of low electric field EF, the film L(3j−2) having a high refractive index (such as first film L1 and fourth film L4) and the film L(3j−1) having a low refractive index (such as second film L2 and fifth film L5) are placed.

Thus, in the mirror 110, in the region of high electric field EF, the refractive index gradually decreases, and the refractive index difference is small. In the portion where the refractive index discontinuously changes from the low refractive index to the high refractive index, the electric field EF is substantially zero.

As the refractive index difference of the media on both sides of the interface becomes smaller, the interface scattering loss becomes lower. Hence, in the film L(3j) having a gradually decreasing refractive index located in the region of high electric field EF, the interface scattering loss is suppressed. Furthermore, the interface scattering loss is suppressed also at the interface between the film L(3j) having a gradually decreasing refractive index and the film L(3j−2) having a high refractive index, and the interface between the film L(3j) having a gradually decreasing refractive index and the film L(3j−1) having a low refractive index.

Furthermore, as the electric field at the interface becomes lower, the interface scattering loss becomes lower. Hence, the interface scattering loss is suppressed at the interface between the film L(3j−1) having a low refractive index and the film L(3j+1) having a high refractive index, where the refractive index discontinuously changes from the low refractive index to the high refractive index. Furthermore, for instance, the interface scattering loss is suppressed at the interface between the film L(3j−1) having a low refractive index of the triple-layer structural body BSj and the layer having a high refractive index of another dielectric layer neighboring the triple-layer structural body BSj on the opposite side from the incident surface IS of the triple-layer structural body BSj.

Thus, in the mirror 110, the refractive index is gradually decreased in the region of high electric field EF, and the refractive index is discontinuously increased in the region where the electric field EF is substantially zero. Hence, the interface scattering loss can be suppressed.

Furthermore, in the mirror 110, because the refractive index is decreased in the region of high electric field EF, the reflectance can be maintained at a high value. That is, in the region of high electric field EF, the refractive index changes e.g. from the high refractive index $n_H$ to the low refractive index $n_L$. Hence, the reflectance can be maintained at a high value.

Thus, the mirror 110 according to the embodiment can provide a low-loss high-reflection mirror.

The interface scattering loss caused by scattering due to fine unevenness of the interface, and the reflectance at the interface having a refractive index difference, are both high in the region of high electric field EF. However, there is a difference in characteristics between the interface scattering loss and the reflectance. Thus, by gradually decreasing the refractive index in the region of high electric field EF, the interface scattering loss can be reduced without decreasing the reflectance. That is, in the region of high electric field EF, the refractive index is gradually decreased e.g. from the high refractive index $n_H$ to the low refractive index $n_L$. Thus, the interface scattering loss can be reduced without decreasing the reflectance.

As shown in FIG. 1C, the electric field EF is high in the center portion and low at the end in the thickness direction (Z-axis direction) of each triple-layer structural body BS. Here, in the region having a thickness of λ/4 or less (the region having a thickness of half the thickness of the triple-layer structural body BS) in the center portion in the thickness direction of each triple-layer structural body BS, the electric field EF can be regarded as being relatively high. Thus, corresponding to the region of high electric field EF, the thickness of the film L(3j) having a gradually decreasing refractive index (such as third film L3 and sixth film L6) is set in the range from a value larger than zero to a value of λ/4 or less.

Hence, in each triple-layer structural body BS, the thicknesses of the film L(3j−2) having a high refractive index (such as first film L1 and fourth film L4) and the film L(3j−1) having a low refractive index (such as second film L2 and fifth film L5) placed on both sides of the film L(3j) having a gradually decreasing refractive index are each set to a value in the range larger than λ/8 and smaller than λ/4.

Here, the thickness of the triple-layer structural body BS is λ/2. Hence, the case where the thickness of the film L(3j−2) having a high refractive index and the film L(3j−1) having a low refractive index is λ/4 corresponds to not providing the film L(3j) having a gradually decreasing refractive index.

As described above, in the mirror 110 according to the embodiment, while the refractive index is changed (gradually decreased) in the region of high electric field EF, the refractive index is discontinuously changed from the low refractive index to the high refractive index in the region where the electric field EF is substantially zero. Thus, the interface scattering loss is suppressed. At the same time, in the region of high electric field EF, by decreasing the refractive index, the reflectance can be maintained at a high value. That is, in the region of high electric field EF, by changing the refractive index e.g. from the high refractive index $n_H$ to the low refractive index $n_L$, the reflectance can be maintained at a high value.

Here, for instance, the mirror 110 can be placed in air (or a vacuum), and the light traveling in air (or a vacuum) can be reflected by the mirror 110. In this case, as illustrated in FIGS. 1A to 1C, for instance, the mirror 110 is provided on the substrate BS. The opposite side of the mirror 110 from the substrate BS serves as an incident surface IS.

Alternatively, for instance, the mirror 110 can be provided on the surface of a bulk dielectric, and the light traveling in the bulk dielectric can be reflected by the mirror 110. In this case, the bulk dielectric side of the mirror 110 serves as an incident surface IS. For instance, this configuration is adopted in e.g. an optical resonator in which light reciprocates in the bulk dielectric by the mirrors placed on its surfaces.

In the case where a plurality of triple-layer structural bodies BS are provided in the plurality of dielectric layers DL, the arrangement of the triple-layer structural bodies BS is arbitrary. However, as described above, it is preferable from the viewpoint of high reflectance and low loss that one of the triple-layer structural bodies BS be placed on the side nearest to the incident surface IS of the plurality of dielectric layers DL.

In the case where the number N of triple-layer structural bodies BS is 2 or more, for convenience, it is assumed that the first triple-layer structural body BS1 is placed on the side nearest to the incident surface IS. Furthermore, it is assumed that the second triple-layer structural body BS2 is placed at a position farther from the incident surface IS than the first triple-layer structural body BS1.

For instance, in the case where the number N of triple-layer structural bodies BS is 3, for convenience, it is assumed that the first triple-layer structural body BS1 is placed on the side nearest to the incident surface IS. Furthermore, it is assumed that the second triple-layer structural body BS2 is placed on the side farther from the incident surface IS than the first triple-layer structural body BS1. Furthermore, it is assumed that the third triple-layer structural body BS3 is placed on the side farther from the incident surface IS than the second triple-layer structural body BS2.

However, in the case where the number N of triple-layer structural bodies BS is 3 or more, attention can be focused on the positional relationship between the first triple-layer structural body BS1 and the second triple-layer structural body BS2. Then, for instance, the triple-layer structural body BS second nearest to the incident surface IS may be referred to as the first triple-layer structural body BS1. The second triple-layer structural body BS2 may be regarded as being placed on the opposite side of the first triple-layer structural body BS1 from the incident surface IS. That is, the first triple-layer structural body BS1 does not necessarily need to be placed on the side nearest to the incident surface IS of the three or more triple-layer structural bodies BS. Any triple-layer structural body BS of the three or more triple-layer structural bodies BS may be regarded as the first triple-layer structural body BS1. The triple-layer structural body BS on the farther side of that first triple-layer structural body BS1 from the incident surface IS may be regarded as the second triple-layer structural body BS2.

FIG. 2A, FIG. 2B, and FIG. 2C are schematic views illustrating the configuration of another mirror according to the embodiment.

More specifically, FIG. 2A is a schematic sectional view of the alternative mirror 111d according to the embodiment. FIG. 2B is a graph illustrating the characteristics of the mirror 111d. The horizontal axis represents position, and the vertical axis represents refractive index n. FIG. 2C is a graph illustrating the characteristics of the mirror 111d. The horizontal axis represents position, and the vertical axis represents electric field EF.

As shown in FIG. 2A, in the mirror 111d, a dielectric layer DL of the plurality of dielectric layers DL different from the dielectric layer DL including the first triple-layer structural body BS1 includes a first double-layer structural body SF1.

In the specific example, in the mirror 111d, four of the plurality of dielectric layers DL are dielectric layers DL including the triple-layer structural body BS. That is, four triple-layer structural bodies BS (first triple-layer structural body BS1, second triple-layer structural body BS2, third triple-layer structural body BS3, and fourth triple-layer structural body BS4) are provided. Furthermore, one or more double-layer structural bodies SF1 are provided. FIG. 2A illustrates two double-layer structural bodies SF (first double-layer structural body SF1 and second double-layer structural body SF2).

The first double-layer structural body SF1 includes a first high refractive index film HF1 of dielectric and a first low refractive index film LF1 of dielectric.

The second film L2 is disposed between the first film L1 and the first low refractive index film LF1. The first high refractive index film HF1 is disposed between the second film L2 and the first low refractive index film LF1.

In other words, the first high refractive index film HF1 is provided on the opposite side of the second film L2 from the third film L3.

As shown in FIG. 2B, the first high refractive index film HF1 has a thickness of ¼ of the design wavelength (λ/4).

The first low refractive index film LF1 is provided on the opposite side of the first high refractive index film HF1 from the second film L2. In the specific example, the first low refractive index film LF1 is provided on the opposite side of the first high refractive index film HF1 from the fourth triple-layer structural body BS4.

The first low refractive index film LF1 has a thickness of ¼ of the design wavelength (λ/4), and has a lower refractive index than the first high refractive index film HF1.

Thus, the first double-layer structural body SF1 has a double-layer structure of a layer having a high refractive index (first high refractive index film HF1) and a layer having a low refractive index lower than the high refractive index (first low refractive index film LF1).

Thus, in the mirror 111d, one or more of the plurality of dielectric layers DL include a triple-layer structural body BS having a triple-layer structure. One or more others of the plurality of dielectric layers DL include a double-layer structural body SF1 having a double-layer structure (such as first double-layer structural body SF1).

In the mirror 111d, the number of triple-layer structural bodies BS may be one. In this case, the first double-layer structural body SF1 is provided on the opposite side of the first triple-layer structural body BS1 from the incident surface IS (the opposite side of the second film L2 from the first film L1). That is, the first high refractive index film HF1 is provided on the opposite side of the first triple-layer structural body BS1 from the incident surface IS. The first low refractive index film LF1 is provided on the opposite side of the first high refractive index film HF1 from the first triple-layer structural body BS1.

In the case where a plurality of triple-layer structural bodies BS are provided, i.e., in the case where the mirror 111d includes the first triple-layer structural body BS1 and the second triple-layer structural body BS2, the first double-layer structural body SF1 is provided on the opposite side of the second triple-layer structural body BS2 from the first triple-layer structural body BS1. That is, the first high refractive index film HF1 is provided on the opposite side of the second triple-layer structural body BS2 from the first triple-layer structural body BS1. The first low refractive index film LF1 is provided on the opposite side of the first high refractive index film HF1 from the second triple-layer structural body BS2.

Furthermore, as shown in FIG. 2A and FIG. 2B, in the mirror 111d according to the embodiment, one of the plurality of dielectric layers DL is a dielectric layer DL including a triple-layer structural body BS, another dielectric layer DL is a dielectric layer including a first double-layer structural body SF1, and still another dielectric layer DL is a dielectric layer including a second double-layer structural body SF2.

The second double-layer structural body SF2 is provided on the opposite side of the first double-layer structural body SF1 from the first triple-layer structural body BS1. That is, the second double-layer structural body SF2 is placed at a position more distant from the incident surface IS than the first double-layer structural body SF1.

That is, for instance, in the case where one triple-layer structural body BS is provided, a dielectric layer DL of the plurality of dielectric layers DL different from the dielectric layer DL including the first triple-layer structural body BS1 and the dielectric layer DL including the first double-layer structural body SF1 includes a second double-layer structural body SF2. The second double-layer structural body SF2 is provided on the opposite side of the first double-layer structural body SF1 from the first triple-layer structural body BS1.

Furthermore, for instance, in the case where double or more triple-layer structural bodies BS (such as first triple-layer structural body BS1 and second triple-layer structural body BS2) are provided, a dielectric layer DL of the plurality of dielectric layers DL different from the dielectric layer DL including the first triple-layer structural body BS1, the dielectric layer DL including the second triple-layer structural body BS2, and the dielectric layer DL including the first double-layer structural body SF1 includes a second double-layer structural body SF2. The second double-layer structural body SF2 is provided on the opposite side of the first double-layer structural body SF1 from the second triple-layer structural body BS2.

The second double-layer structural body SF2 includes a second high refractive index film HF2 and a second low refractive index film LF2.

The second high refractive index film HF2 is provided on the opposite side of the first low refractive index film LF1 from the first high refractive index film HF1. The second high refractive index film HF2 has a thickness of ¼ of the design wavelength ($\lambda/4$).

The second low refractive index film LF2 is provided on the opposite side of the second high refractive index film HF2 from the first double-layer structural body SF1. The second low refractive index film LF2 has a thickness of ¼ of the design wavelength ($\lambda/4$), and has a lower refractive index than the second high refractive index film HF2.

Thus, the second double-layer structural body SF2 also has a double-layer structure of a layer having a high refractive index (second high refractive index film HF2) and a layer having a low refractive index lower than the high refractive index (second low refractive index film LF2). A plurality of double-layer structural bodies SF having such a double-layer structure can be provided.

Thus, the mirror 111d can include a plurality of double-layer structural bodies SF. One of the double-layer structural bodies SF can be configured as a first double-layer structural body SF1. A double-layer structural body SF different from the first double-layer structural body SF1 can be configured as a second double-layer structural body SF2.

Here, the number of double-layer structural bodies SF is denoted by M (M is an integer of 1 or more and K−1 or less). The number K of the plurality of dielectric layers DL is e.g. N+M. As N+M becomes larger, the reflectance becomes higher. When N+M is constant, as the number N of triple-layer structural bodies BS becomes larger, the interface scattering loss can be made lower. Here, in the case where the fabrication of the triple-layer structural body BS is more difficult than the fabrication of the double-layer structural body SF, an appropriate number is selected as the number N of triple-layer structural bodies BS so as to relatively facilitate the fabrication while reducing the interface scattering loss.

In the case where the number M of double-layer structural bodies SF is 2 or more, it is assumed that the first double-layer structural body SF1 is the one nearest to the incident surface IS of the plurality of double-layer structural bodies SF, and placed on the triple-layer structural body BS side. Furthermore, it is assumed that the second double-layer structural body SF2 is placed on the side farther from the incident surface IS than the first double-layer structural body SF1.

Again, in the case where the number M of double-layer structural bodies SF is 3 or more, attention can be focused on the positional relationship between the first double-layer structural body SF1 and the second double-layer structural body SF2. Then, for instance, the double-layer structural body SF second nearest to the incident surface IS can be referred to as the first double-layer structural body SF1. The second double-layer structural body SF2 can be regarded as being placed on the opposite side of the first double-layer structural body SF1 from the incident surface IS. That is, the first double-layer structural body SF1 does not necessarily need to be placed on the side nearest to the incident surface IS of the three or more double-layer structural bodies SF. Any double-layer structural body SF of the three or more double-layer structural bodies SF can be regarded as the first double-layer structural body SF1. The double-layer structural body SF on the farther side of that first double-layer structural body SF1 from the incident surface can be regarded as the second double-layer structural body SF2.

Thus, the mirror according to the embodiment includes one or more triple-layer structural bodies BS having a triple-layer structure. The mirror according to the embodiment can further include one or more double-layer structural bodies SF having a double-layer structure.

The characteristics of the mirror according to the embodiment thus configured are now described with reference to comparative examples.

First Comparative Example

FIG. 3A, FIG. 3B, and FIG. 3C are schematic views illustrating the configuration of a mirror of a first comparative example.

More specifically, FIG. 3A is a schematic sectional view of the mirror 118 of the first comparative example. In FIG. 3A, the substrate SB is not shown. FIG. 3B is a graph illustrating the characteristics of the mirror 118. The horizontal axis represents position, and the vertical axis represents refractive index n. FIG. 3C is a graph illustrating the characteristics of the mirror 118. The horizontal axis represents position, and the vertical axis represents electric field EF.

As shown in FIG. 3A and FIG. 3B, the mirror 118 of the first comparative example includes only double-layer structural bodies SF having a double-layer structure (such as first to sixth double-layer structural bodies SF1-SF6). However, the mirror 118 does not include triple-layer structural bodies BS having a triple-layer structure.

The double-layer structural body SF has a double-layer structure of a layer having a high refractive index (such as first high refractive index film HF1) and a layer having a low refractive index lower than the high refractive index (such as first low refractive index film LF1). In the double-layer structural body SF, the direction from the layer having a high refractive index toward the layer having a low refractive index is defined as the positive direction of the Z axis. It is assumed that the incident surface IS is the opposite surface of the first high refractive index film HF of the first double-layer structural body SF1 from the first low refractive index film LF1.

As shown in FIG. 3C, in the mirror 118, toward the positive direction of the Z axis, the refractive index is decreased discontinuously and significantly in the portion of high electric field EF. Because of the large refractive index difference in the region of high electric field EF, it is considered that the reflectance is high. However, the refractive index difference is too large in the region of high electric field EF. Hence, it is considered that the interface scattering loss is high.

Second Comparative Example

Figure 4B:
Figure 4C:
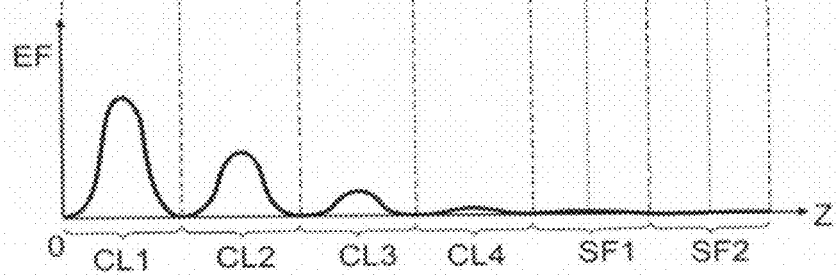

FIG. 4A, FIG. 4B, and FIG. 4C are schematic views illustrating the configuration of a mirror of a second comparative example.

More specifically, FIG. 4A is a schematic sectional view of the mirror 119 (and the mirror 119d) of the second comparative example. In FIG. 4A, the substrate SB is not shown. FIG. 4B is a graph illustrating the characteristics of the mirror 119 (and the mirror 119d). The horizontal axis represents position, and the vertical axis represents refractive index n. FIG. 4C is a graph illustrating the characteristics of the mirror 119 (and the mirror 119d). The horizontal axis represents position, and the vertical axis represents electric field EF.

As shown in FIG. 4A and FIG. 4B, the mirror 119 of the second comparative example includes a plurality of graded refractive index layers CL (such as first to fourth graded refractive index layers CL1-CL4).

In each graded refractive index layer CL, along the direction from the incident surface IS of the mirror 119 toward the inside of the mirror 119, the refractive index n is decreased from the high refractive index $n_H$ toward the low refractive index $n_L$. That is, in each of the plurality of graded refractive index layers CL, the refractive index n is decreased along the layer thickness direction.

Here, the direction of decreasing refractive index in each graded refractive index layer CL is defined as the positive direction of the Z axis. That is, it is assumed that the side of the layer having a high refractive index is the incident surface IS. The direction from the incident surface IS toward the inside of the graded refractive index layer CL is the positive direction of the Z axis.

That is, the mirror 119 of the second comparative example corresponds to e.g. the mirror 110 according to the first embodiment except the following. The triple-layer structural body BS does not include the first film L1 having a high refractive index and the second film L2 having a low refractive index. Only the layer having a refractive index decreasing (gradually decreasing) along the layer thickness direction (such as third dielectric thin film) is provided in each of the plurality of graded refractive index layers CL.

That is, in each graded refractive index layer CL, the refractive index is changed (gradually decreased) over the entire region in the thickness direction.

Furthermore, in such a mirror 119, besides the graded refractive index layers CL described above, double-layer structural bodies SF having a double-layer structure (such as first and second double-layer structural bodies SF1 and SF2) can be provided. A mirror can be configured to include four graded refractive index layers CL (such as first to fourth graded refractive index layers CL1-CL4) and additionally double-layer structural bodies SF. This mirror is referred to as mirror 119d.

Such configurations of the mirror 119 and the mirror 119d correspond to the configuration of the mirror described in e.g. Non-Patent Document 1 (O. Arnon and P. Baumeister, "Electric field distribution and the reduction of laser damage in multilayers", 1 Jun. 1980, Vol. 19, No. 11, APPLIED OPTICS, pp. 1853-1855).

As shown in FIG. 4C, in the mirror 119 (and the mirror 119d) of the second comparative example, toward the positive direction of the Z axis, the refractive index is continuously decreased irrespective of the magnitude of the electric field EF. Thus, in the second comparative example, because of the small refractive index change in the region of high electric field EF, it is expected that the interface scattering loss is suppressed. However, in the second comparative example, the refractive index decreases also in the region of low electric field EF. Thus, the refractive index change in the region of high electric field EF is insufficient. As a result, it is considered that the reflectance decreases.

In contrast, in the mirror 110 according to the embodiment, by changing (gradually decreasing) the refractive index in the region of high electric field EF, the interface scattering loss is suppressed. Furthermore, the gradual decrease of the refractive index in the region of high electric field EF enables efficient reflection, and the reflectance can be maintained at a high value. That is, the gradual decrease of the refractive index in the region of high electric field EF e.g. from the high refractive index $n_H$ to the low refractive index $n_L$ enables efficient reflection, and the reflectance can be maintained at a high value.

In the following, the characteristics of the mirror according to the embodiment and the mirrors of the first and second comparative examples are described with reference to simulation results.

In this simulation, in the mirror, the total of the number of triple-layer structural bodies BS and the number of double-layer structural bodies SF is set to 20. Furthermore, the total of the number of graded refractive index layers CL and the number of double-layer structural bodies SF is set to 20.

That is, Ni (Ni is an integer of zero or more) of the 20 double-layer structural bodies SF nearer to the incident surface IS are replaced by triple-layer structural bodies BS or graded refractive index layers CL. The replacement number Ni being zero corresponds to the mirror 118 of the first comparative example.

The case where Ni double-layer structural bodies SF are replaced by triple-layer structural bodies BS with the replacement number Ni being 1 or more corresponds to the mirror 110 according to the embodiment. In the case where the replacement number Ni is 20, 20 triple-layer structural bodies BS are provided, and no double-layer structural bodies SF are provided. The replacement number Ni being 4 corresponds to the mirror 111d illustrated in FIGS. 2A to 2C.

The case where Ni double-layer structural bodies SF are replaced by graded refractive index layers CL with the replacement number Ni being 1 or more corresponds to the mirror 119 of the second comparative example. In the case where the replacement number Ni is 20, 20 graded refractive index layers CL are provided, and no double-layer structural bodies SF are provided. The replacement number Ni being 4 corresponds to the mirror 119d illustrated in FIGS. 4A to 4C.

In this simulation, the design wavelength 2 is set to 550 nm (nanometers). In the embodiment, the design wavelength is arbitrary, for example, not less than 370 nm and not more than 1000 nm.

In the mirror 110 (and the mirror 111d) according to the embodiment, Ni triple-layer structural bodies BS are set to the same configuration.

That is, the thickness of the film L(3j−2) having a high refractive index and the film L(3j−1) having a low refractive index is set to 3λ/16. The thickness of the film L(3j) having a gradually decreasing refractive index is set to λ/8. Here, the thickness of each triple-layer structural body BS is λ/2.

The refractive index of the film L(3j−2) having a high refractive index (such as first refractive index n1 and fourth refractive index n4) is the high refractive index $n_H$, set to 2.1. The refractive index of the film L(3j−1) having a low refractive index (such as second refractive index n2 and fifth refractive index n5) is the low refractive index $n_L$, set to 1.46. The refractive index of the film L(3j) having a gradually decreasing refractive index (such as third refractive index n3 and sixth refractive index n6) is assumed to linearly decrease from the high refractive index $n_H$ (2.1) toward the low refractive index $n_L$ (1.46) from the side of the film L(3j−2) having a high refractive index toward the side of the film L(3j−1) having a low refractive index. Specifically, the film L(3j) having a gradually decreasing refractive index is partitioned into 100 layers. The refractive index of the film L(3j) having a gradually decreasing refractive index is assumed to decrease stepwise in 100 steps from the high refractive index $n_H$ (2.1) toward the low refractive index $n_L$ (1.46). This partition number is sufficiently large. Hence, the refractive index of the film L(3j) having a gradually decreasing refractive index can be regarded as linearly and continuously decreasing.

The magnitude of interface roughness (the standard deviation of the height of interface unevenness) of the film L(3j-2) having a high refractive index, the film L(3j-1) having a low refractive index, and the film L(3j) having a gradually decreasing refractive index is set to 0.1 nm.

On the other hand, the double-layer structural bodies SF are set to the same configuration. That is, as described above, the thickness of each of the layer having a high refractive index and the layer having a low refractive index is $\lambda/4$. The thickness of each double-layer structural body SF is $\lambda/2$. In each double-layer structural body SF, the refractive index of the layer having a high refractive index is the high refractive index $n_H$ (2.1), and the refractive index of the layer having a low refractive index is the low refractive index $n_L$ (1.46). The magnitude of interface roughness (the standard deviation of the height of interface unevenness) of the layer having a high refractive index and the layer having a low refractive index is set to 0.1 nm.

Furthermore, the graded refractive index layers CL are set to the same configuration. That is, as described above, the thickness of each graded refractive index layer CL is $\lambda/2$. In each graded refractive index layer CL, the refractive index is assumed to linearly change along the thickness direction (Z-axis direction), with the refractive index of the incident surface IS side (e.g., the opposite side from the substrate SB) being the high refractive index $n_H$ (2.1), and the refractive index of the opposite side from the incident surface IS (e.g., the substrate SB side) being the low refractive index $n_L$ (1.46). Also in this case, the graded refractive index layer CL is partitioned into 100 layers. The refractive index is assumed to decrease stepwise in 100 steps from the high refractive index $n_H$ (2.1) toward the low refractive index $n_L$ (1.46). The magnitude of interface roughness (the standard deviation of the height of interface unevenness) of each graded refractive index layer CL is set to 0.1 nm.

Figure 5A:
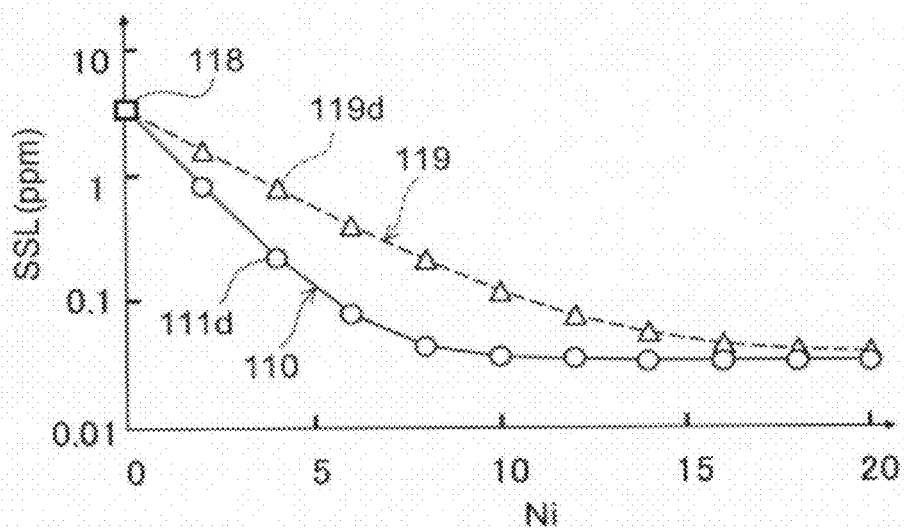
FIG. 5A and FIG. 5B are graphs showing the characteristics of the mirrors.
Figure 5B:
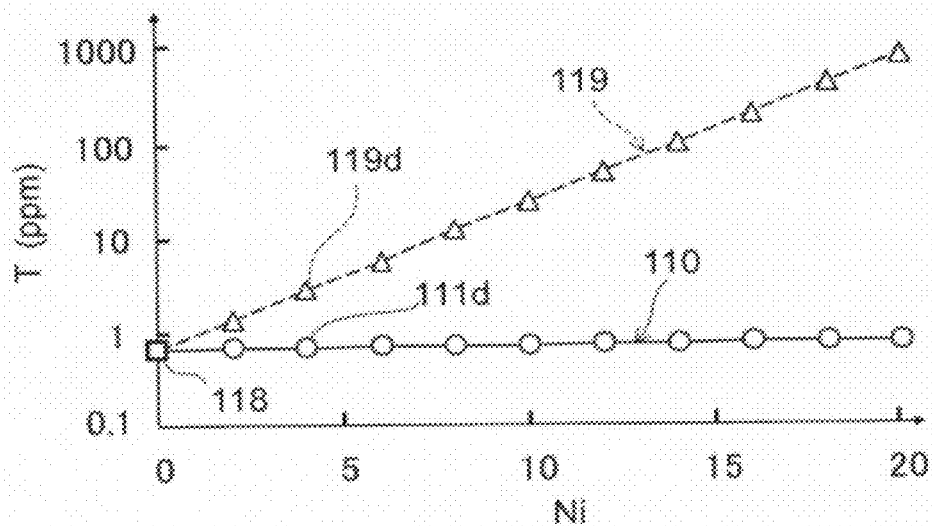

FIG. 5A and FIG. 5B are graphs illustrating the characteristics of the mirrors according to the embodiment and the mirrors of the comparative examples.

More specifically, FIG. 5A illustrates the relationship between the interface scattering loss SSL and the replacement number Ni of the mirror. The horizontal axis represents the replacement number Ni, and the vertical axis represents the interface scattering loss SSL. Here, the vertical axis is presented in a logarithmic scale. FIG. 5B illustrates the relationship between the transmittance T and the replacement number Ni of the mirror. The horizontal axis represents the replacement number Ni, and the vertical axis represents the transmittance T. Here, the vertical axis is presented in a logarithmic scale.

In these figures, the replacement number Ni being zero corresponds to the mirror 118 of the first comparative example.

In the case where the replacement number Ni is 1 or more, the solid line corresponds to the mirror 110 (including the mirror 111d) according to the embodiment, and the dashed line corresponds to the mirror 119 (including the mirror 119d) of the second comparative example.

As shown in FIG. 5A, the interface scattering loss SSL of the mirror 118 of the first comparative example is approximately 4 ppm, which is large.

In the mirror 119 of the second comparative example, the interface scattering loss SSL is decreased with the increase of the replacement number Ni. As described above, this is considered to be the effect of the small refractive index difference in the region of high electric field in the second comparative example. However, the degree of decrease of the interface scattering loss SSL is not large. For instance, in the mirror 119d with the replacement number Ni being 4, the interface scattering loss SSL is approximately 0.9 ppm. In the case where the replacement number Ni is 10, the interface scattering loss SSL is approximately 0.1 ppm.

Also in the mirror 110 according to the embodiment, the interface scattering loss SSL is decreased with the increase of the replacement number Ni. This is also due to the effect of the small refractive index difference in the region of high electric field. However, in the mirror 110 according to the embodiment, the degree of the decrease of the interface scattering loss SSL is large. For instance, in the mirror 111d with the replacement number Ni being 4, the interface scattering loss SSL is approximately 0.2 ppm. In the case where the replacement number Ni is 10, the interface scattering loss SSL is approximately 0.04 ppm.

Thus, in the mirror 110 according to the embodiment, the effect of the decrease of the interface scattering loss SSL is larger than in the mirror 119 of the second comparative example.

On the other hand, as shown in FIG. 5B, the transmittance T of the mirror 118 of the first comparative example is approximately 0.8 ppm, which is small.

In the mirror 119 of the second comparative example, the transmittance T is significantly increased with the increase of the replacement number Ni. For instance, in the mirror 119d with the replacement number Ni being 4, the transmittance T is approximately 4 ppm. In the case where the replacement number Ni is 10, the transmittance T is approximately 20 ppm. Thus, in the second comparative example, the transmittance increases (the reflectance decreases). The reason for this is considered as follows. In the second comparative example, the refractive index decreases also in the region of low electric field EF. Hence, the refractive index change in the region of high electric field EF is insufficient.

In contrast, in the mirror 110 according to the embodiment, the transmittance T is small irrespective of the replacement number Ni. For instance, both in the mirror 119d with the replacement number Ni being 4 and in the case where the replacement number Ni is 10, the transmittance T is approximately 0.8 ppm, which is the same as that of the mirror 118 of the first comparative example. Thus, in the mirror 110 according to the embodiment, the transmittance is maintained at a low value, and the reflectance can be maintained at a high value. The reason for this is considered as follows. In the embodiment, the refractive index is substantially constant in the region of low electric field EF. Hence, the refractive index change in the region of high electric field EF is sufficiently large.

Thus, the mirror 119 of the second comparative example uses graded refractive index layers CL. In the graded refractive index layer CL, the refractive index changes over the entire region in the thickness direction. Accordingly, the transmittance T is significantly increased with the increase of the replacement number Ni. In contrast, the mirror 110 according to the embodiment uses triple-layer structural bodies BS. In the triple-layer structural body BS, the refractive index changes in the center portion in the thickness direction (in the specific example, in the region of a width of $\lambda/8$). However, the refractive index is constant in the region at both ends in the thickness direction (in the specific example, in the region of a width of 3λ/16 each). Accordingly, the transmittance T is maintained at a low value independent of the replacement number Ni.

In the mirror 119 of the second comparative example, with the increase of the replacement number Ni, the interface scattering loss SSL decreases, and the transmittance T increases (the reflectance decreases). Thus, these are in a trade-off relationship. Hence, it is difficult to achieve low-loss and high-reflection characteristics.

In contrast, in the mirror 110 according to the embodiment, the transmittance T is small independent of the replacement number Ni. Hence, the interface scattering loss SSL can be effectively decreased. Thus, the low-loss and high-reflection characteristics can be achieved.

Here, as illustrated in FIG. 5A, in the mirror 110 according to the embodiment, when the replacement number Ni is approximately 10 or more, the effect of the decrease of the interface scattering loss SSL is large. Thus, in the specific example where the number of layers is 20, the replacement number Ni is preferably 10 or more. However, any replacement number Ni can be adopted depending on e.g. the characteristics of the triple-layer structural body BS used (such as the thickness and refractive index distribution of each layer included in the triple-layer structural body BS), the total number of layers, and furthermore the target characteristics requirement of the mirror 110.

For instance, also in the case where the replacement number Ni is 1, the interface scattering loss SSL of the mirror 110 according to the embodiment is lower than that of the mirror 118 of the first comparative example and the mirror 119 of the second comparative example. Furthermore, the transmittance T of the mirror 110 is comparable to that of the mirror 118 of the first comparative example and lower than that of the mirror 119 of the second comparative example.

In the mirror 110 according to the embodiment, the fabrication of the double-layer structural body SF having a double-layer structure may be easier than the fabrication of the triple-layer structural body BS having a triple-layer structure. In this case, as the replacement number Ni being equal to the number of triple-layer structural bodies BS becomes smaller, the fabrication of the mirror 110 is advantageously made easier.

In the mirror 119 of the second comparative example described above, in each graded refractive index layer CL, the refractive index linearly changes from the high refractive index $n_H$ toward the low refractive index $n_L$. However, the refractive index may change curvilinearly. Also in this case, the characteristics almost similar to the characteristics of the aforementioned mirror 119 are exhibited as long as the refractive index gradually decreases over the entire region of the graded refractive index layer CL.

In a dielectric multilayer film mirror like the mirror 118 of the first comparative example, two kinds of dielectric thin films are alternately stacked. The two kinds of dielectric thin films are a layer having a high refractive index and a thickness of λ/4, and a layer having a low refractive index and a thickness of λ/4. In such a dielectric multilayer film mirror, the loss of the mirror is caused by e.g. absorption and scattering. In the case of using a material having low absorption, scattering is the major cause of the loss of the mirror. The scattering can include interface scattering due to roughness at the interface of two media having different refractive indices, and bulk scattering in one medium. In the dielectric multilayer film mirror as described above, scattering at the interface having a large refractive index difference is the major cause of the loss in the mirror.

The mirror 110 (and the mirror 111d) according to the embodiment has the effect of particularly reducing the loss caused by interface scattering due to roughness at the interface of two media having different refractive indices.

The characteristics of the triple-layer structural body BS in the mirror 110 (and the mirror 111d) according to the embodiment can be variously modified. More specifically, depending on the material and the fabrication method used for the triple-layer structural body BS, the triple-layer structural body BS can have various characteristics. In the following, example characteristics of the triple-layer structural body BS are described. More specifically, in the following, example characteristics of the first film L1, the second film L2, and the third film L3 of the first triple-layer structural body BS1 as the triple-layer structural body BS are described.

FIG. 6A to FIG. 6I are graphs illustrating the characteristics of the mirror according to the embodiment.

In these figures, the horizontal axis represents position, and the vertical axis represents refractive index n. The incident surface IS is placed at the position of Z=0. The plurality of dielectric layers DL are provided in the region of Z>0.

Figure 6A:
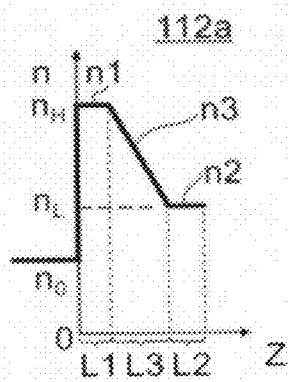
FIG. 6A to FIG. 6I are graphs showing the characteristics of mirrors.
Figure 6B:
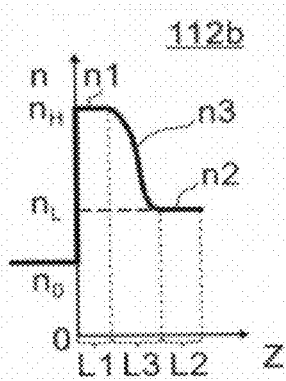
Figure 6C:
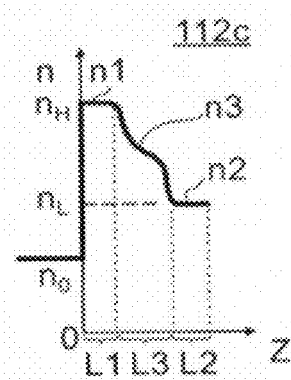

As shown in FIG. 6A, FIG. 6B, and FIG. 6C, in the mirrors 112a, 112b, and 112c according to the embodiment, the first refractive index n1 of the first film L1 is constant, and the second refractive index n2 of the second film L2 is constant.

As shown in FIG. 6A, in the mirror 112a, the third refractive index n3 of the third film L3 is linearly and gradually decreased. That is, the rate of change of the third refractive index n3 of the third film L3 is constant along the Z-axis direction.

As shown in FIG. 6B, in the mirror 112b, the rate of change of the third refractive index n3 of the third film L3 is large in the center portion in the Z-axis direction of the third film L3, and small in the end portion in the Z-axis direction of the third film L3.

As shown in FIG. 6C, in the mirror 112c, the rate of change of the third refractive index n3 of the third film L3 is small in the center portion in the Z-axis direction of the third film L3, and large in the end portion in the Z-axis direction of the third film L3.

Figure 6D:
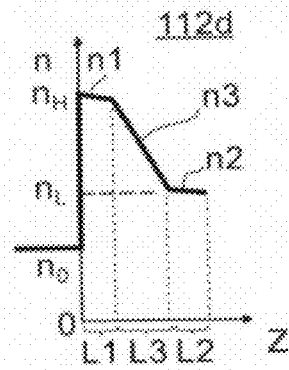
Figure 6E:
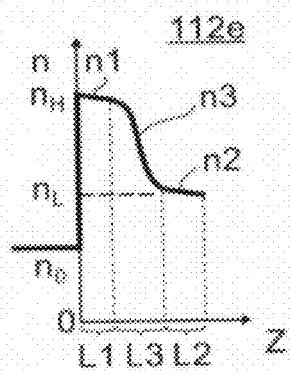
Figure 6F:
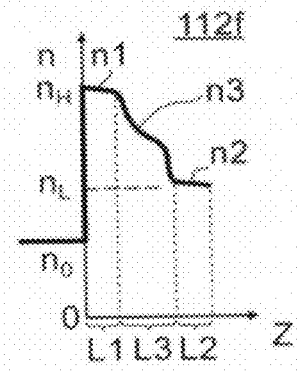

As shown in FIG. 6D, FIG. 6E, and FIG. 6F, in the mirrors 112d, 112e, and 112f according to the embodiment, the first refractive index n1 of the first film L1 and the second refractive index n2 of the second film L2 are decreased along the positive direction of the Z axis.

The characteristics of the third refractive index n3 of the third film L3 in the mirrors 112d, 112e, and 112f are similar to those of the mirrors 112a, 112b, and 112c, respectively.

Figure 6G:
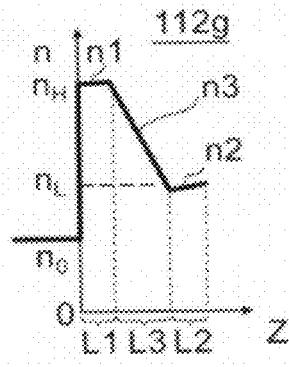
Figure 6H:
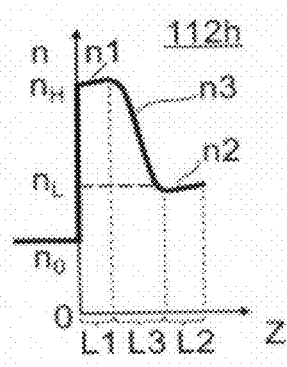
Figure 6I:
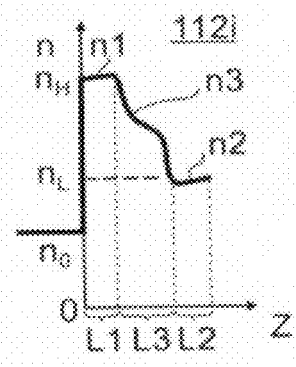

As shown in FIG. 6G, FIG. 6H, and FIG. 6I, in the mirrors 112g, 112h, and 112i according to the embodiment, the first refractive index n1 of the first film L1 and the second refractive index n2 of the second film L2 are increased along the positive direction of the Z axis.

The characteristics of the third refractive index n3 of the third film L3 in the mirrors 112g, 112h, and 112i are similar to those of the mirrors 112a, 112b, and 112c, respectively.

Thus, in the mirror according to the embodiment, the characteristics of the first film L1, the second film L2, and the third film L3 can be variously modified.

In the aforementioned mirrors 112d-112i, the first refractive index n1 of the first film L1 and the second refractive index n2 of the second film L2 change along the Z-axis direction. Even in this case, the degree of the change is smaller than the degree of the change (gradual decrease) of the third refractive index n3 in the third film L3.

Thus, the first refractive index n1 of the first film L1 and the second refractive index n2 of the second film L2 do not necessarily need to be uniform as long as the degree of the change of the first refractive index n1 and the second refractive index n2 is sufficiently smaller than the degree of the change of the third refractive index of the third film L3.

In the third film L3, the third refractive index n3 gradually decreases from the first film L1 toward the second film L2. In this case, the change (gradual decrease) of the third refractive index n3 may be stepwise. In the following, the characteristics of the change of the third refractive index n3 are described.

FIG. 7A, FIG. 7B, FIG. 7C, and FIG. 7D are schematic views illustrating the configuration of alternative mirrors according to the embodiment.

More specifically, FIG. 7A is a schematic sectional view of an alternative mirror 120b according to the embodiment. FIG. 7B is a graph illustrating the characteristics of the mirror 120b. The horizontal axis represents position, and the vertical axis represents refractive index n. FIG. 7C is a schematic sectional view of an alternative mirror 120c according to the embodiment. FIG. 7D is a graph illustrating the characteristics of the mirror 120c. The horizontal axis represents position, and the vertical axis represents refractive index n.

As shown in FIG. 7B, in the mirror 120b, the third refractive index n3 of the third film L3 is changed (gradually decreased) in two steps. More specifically, the third film L3 includes two sublayers stacked. The two sublayers have two respective values between the first refractive index n1 and the second refractive index n2. In FIG. 7A, these sublayers are not shown.

As shown in FIG. 7A, in the mirror 120b, for instance, the first thickness d1 of the first film L1 and the second thickness d2 of the second film L2 are equal, and the third thickness d3 of the third film L3 is $\lambda/10$. The thickness of the sublayer included in the third film L3 is d3/2, which is $(\lambda/10)/2$ in this case.

As shown in FIG. 7D, in the mirror 120c, the third refractive index n3 of the third film L3 is changed (gradually decreased) in three steps. More specifically, the third film L3 includes three sublayers stacked. The three sublayers have three respective values between the first refractive index n1 and the second refractive index n2. In FIG. 7C, these sublayers are not shown.

As shown in FIG. 7C, in the mirror 120c, for instance, the first thickness d1 of the first film L1 and the second thickness d2 of the second film L2 are equal, and the third thickness d3 of the third film L3 is $\lambda/10$. The thickness of the sublayer included in the third film L3 is d3/3, which is $(\lambda/10)/3$ in this case.

Thus, in the embodiment, the third film L3 can include a plurality of sublayers. The refractive index of the plurality of sublayers is decreased from the first film L1 toward the second film L2.

Here, the number of sublayers included in the third film L3 is referred to as sublayer number NML. In the mirror 120 according to the embodiment, the sublayer number NML is an integer of 2 or more, and the third film L3 includes a plurality of sublayers. The sublayer number NML being 2 corresponds to the mirror 120b. The sublayer number NML being 3 corresponds to the mirror 120c.

FIG. 8A, FIG. 8B, FIG. 8C, and FIG. 8D are schematic views illustrating the configuration of mirrors of comparative examples.

Figure 8A:
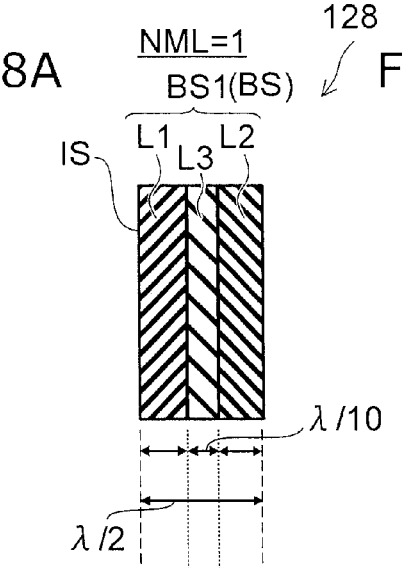
FIG. 8A to FIG. 8D are schematic views showing mirrors of comparative examples.
Figure 8C:
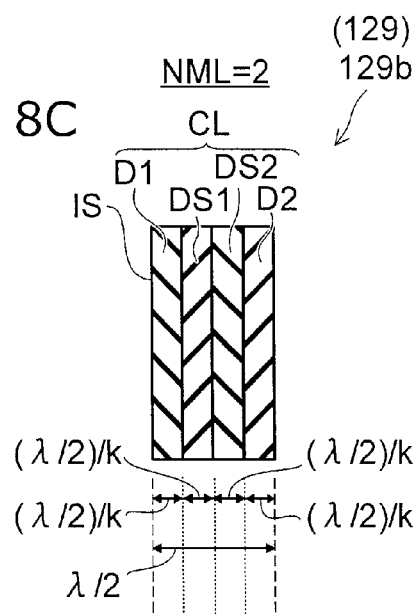
Figure 8B:
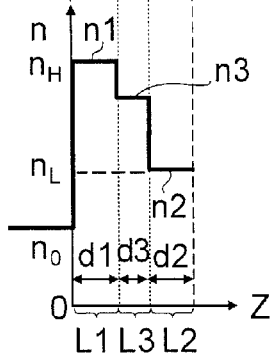
Figure 8D:
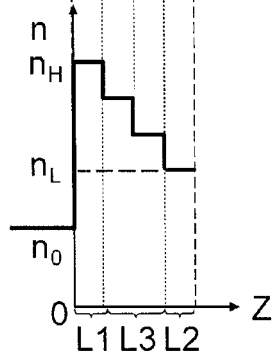

More specifically, FIG. 8A is a schematic sectional view of a mirror 128 according to a third comparative example. FIG. 8B is a graph illustrating the characteristics of the mirror 128. The horizontal axis represents position, and the vertical axis represents refractive index n. FIG. 8C is a schematic sectional view of a mirror 129b according to a fourth comparative example. FIG. 8D is a graph illustrating the characteristics of the mirror 129b. The horizontal axis represents position, and the vertical axis represents refractive index n.

As shown in FIG. 8B, in the mirror 128 of the third comparative example, the third refractive index n3 of the third film L3 is constant, and not gradually decreased. More specifically, the third film L3 is made of one layer and corresponds to the case where the sublayer number NML is 1.

As shown in FIG. 8D, in the mirror 129b of the fourth comparative example, the third film L3 includes two sublayers stacked. The two sublayers have two respective values between the first refractive index n1 and the second refractive index n2. Furthermore, in the mirror 129b, the first film L1, the second film L2, and the sublayers included in the third film L3 are set to the same thickness.

The number of sublayers being arbitrary corresponds to a mirror 129 of the fourth comparative example. In the mirror 129, the number of sublayers included in the third film L3 is NML. The total number k of layers of the first film L1, the second film L2, and the sublayers included in the third film L3 is NML+2. The thickness of the first film L1 and the second film L2, and the thickness of each sublayer included in the third film L3 are $(\lambda/2)/k$.

The mirror 129 of the fourth comparative example with the sublayer number NML being 2 (i.e., k being 4) corresponds to the mirror 129b. In the mirror 129b, in the graded refractive index layer CL, the thickness of the high refractive index layer D1 is $\lambda/4$. The thickness of the low refractive index layer D2 is $\lambda/4$. The intermediate layer between these layers includes two sublayers (sublayer DS1 and sublayer DS2). The thickness of each of the sublayer DS1 and the sublayer DS2 is $\lambda/4$.

The mirror 129 of the fourth comparative example with the sublayer number NML being 1 (i.e., k being 3) corresponds to a mirror 129a (not shown). In the mirror 129a, the thickness of the high refractive index layer D1 and the thickness of the low refractive index layer D2 are $\lambda/3$. The intermediate layer between these layers is one sublayer DS1. The thickness of the sublayer DS1 is $\lambda/3$.

In the mirror 129 of the fourth comparative example, if the total number k of layers is made sufficiently large, i.e., if the sublayer number NML is made sufficiently large, the mirror 129 comes to have a configuration corresponding to the mirror 119 of the second comparative example. The mirror 129 of the fourth comparative example is regarded as including a graded refractive index layer CL.

A simulation result of the characteristics of the mirror 120 for various sublayer numbers NML is now described in conjunction with the characteristics of the mirror 128 of the third comparative example with the sublayer number NML being 1 and the mirror 129 of the fourth comparative example.

In this simulation, in the mirror 120, 20 triple-layer structural bodies BS are stacked with the substrate SB. The triple-layer structural bodies BS are set to the same characteristics. In the mirror 129, 20 graded refractive index layers CL are stacked with the substrate SB. The graded refractive index layers CL are set to the same characteristics. That is, no double-layer structural bodies SF are provided. Furthermore, the high refractive index $n_H$ is set to 2.1. The low refractive index $n_L$ is set to 1.46.

In the mirror 120 according to the embodiment, the refractive index of each sublayer in the third film L3 is determined as values at equal spacings between the high refractive index $n_H$ and the low refractive index $n_L$ divided by the sublayer number NML.

Also in this simulation, the design wavelength λ is set to 550 nm. The magnitude of interface roughness (the standard deviation of the height of interface unevenness) of each layer is set to 0.1 nm.

In the mirror 120, the first thickness d1 of the first film L1 and the second thickness d2 of the second film L2 are equal, and the third thickness d3 of the third film L3 is λ/10. The thickness of the sublayer included in the third film L3 is d3/NML.

On the other hand, in the mirror 129 of the fourth comparative example, the thickness of each of the first film L1, the second film L2, and the sublayer included in the third film L3 is (λ/2)/k, where k is NML+2.

Figure 9A:
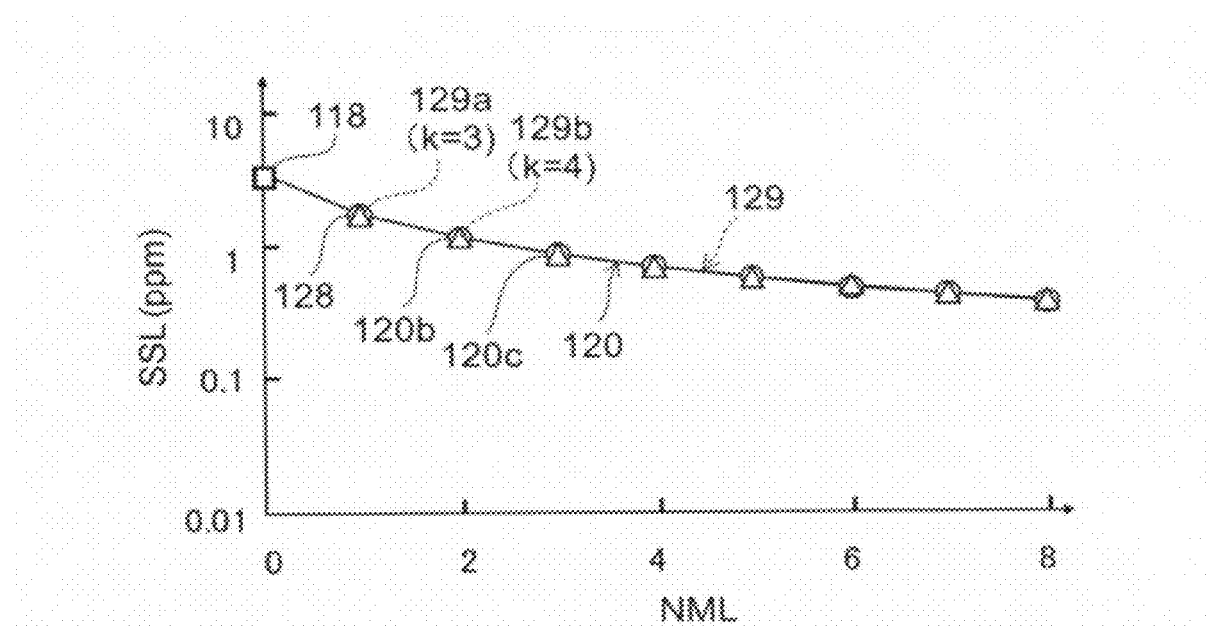
FIG. 9A and FIG. 9B are graphs showing the characteristics of the mirrors.
Figure 9B:
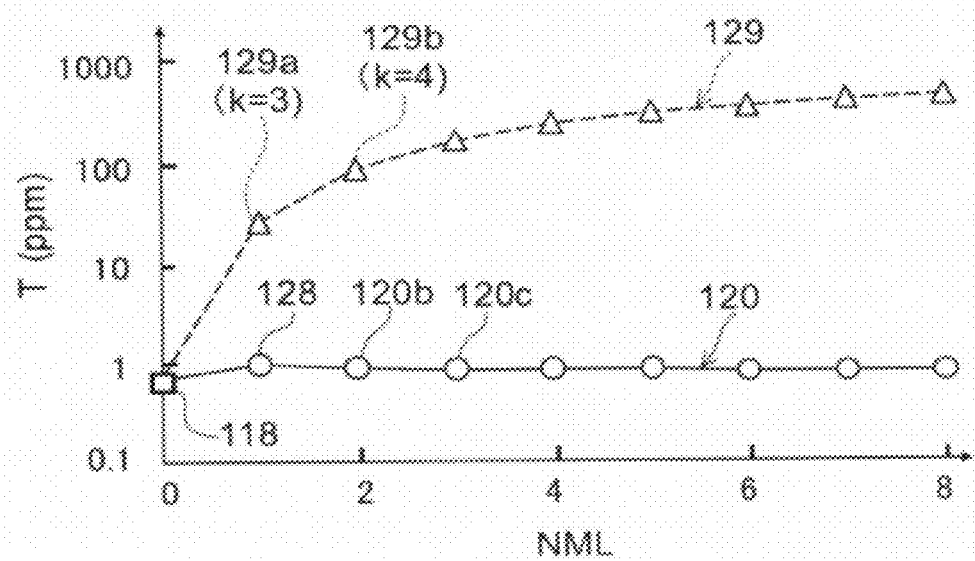

FIG. 9A and FIG. 9B are graphs illustrating the characteristics of the mirrors according to the embodiment and the mirrors of the comparative examples.

More specifically, FIG. 9A illustrates the relationship between the interface scattering loss SSL and the sublayer number NML of the mirror. The horizontal axis represents the sublayer number NML, and the vertical axis represents the interface scattering loss SSL. Here, the vertical axis is presented in a logarithmic scale. FIG. 9B illustrates the relationship between the transmittance T and the sublayer number NML of the mirror. The horizontal axis represents the sublayer number NML, and the vertical axis represents the transmittance T. Here, the vertical axis is presented in a logarithmic scale.

In these figures, the solid line corresponds to the mirror 120 according to the embodiment. In the characteristics shown by the solid line, the sublayer number NML being 2 corresponds to the mirror 120b, and the sublayer number NML being 3 corresponds to the mirror 120c.

In the characteristics shown by the solid line, the sublayer number NML being 1 corresponds to the mirror 128 of the third comparative example.

The dashed line corresponds to the mirror 129 of the fourth comparative example. In the characteristics shown by the dashed line, the sublayer number NML being 1 corresponds to the mirror 129a, and the sublayer number NML being 2 corresponds to the mirror 129b.

The sublayer number NML being zero corresponds to the mirror 118 of the first comparative example.

As shown in FIG. 9A, the interface scattering loss SSL of the mirror 120 according to the embodiment and the mirror 129 of the fourth comparative example is lower than that of the mirror 118 of the first comparative example. The degree of the decrease is comparable in the mirror 120 according to the embodiment and the mirror 129 of the fourth comparative example. The interface scattering loss SSL decreases with the increase of the sublayer number NML.

As shown in FIG. 9B, the transmittance T of the mirror 118 of the first comparative example is low. In the mirror 120 according to the embodiment, the transmittance T is low independent of the sublayer number NML, and comparable to that of the mirror 118 of the first comparative example.

However, in the mirror 129 of the fourth comparative example, the transmittance T is significantly higher than in the first comparative example and the embodiment. Furthermore, in the mirror 129 of the fourth comparative example, the transmittance T increases with the increase of the sublayer number NML. The reason for this is considered as follows. In the fourth comparative example, in the graded refractive index layer CL, the refractive index is changed at equal spacings along the thickness direction. Hence, with the increase of the sublayer number NML, the proportion of refractive index change in the region of low electric field EF increases.

Thus, in the mirror 120 according to the embodiment, as compared with the third comparative example and the fourth comparative example, the interface scattering loss SSL is suppressed, the transmittance T is lower, and the reflectance is higher.

As illustrated in FIG. 9A, in the mirror 120 according to the embodiment, the interface scattering loss SSL decreases as the sublayer number NML becomes larger. Hence, it is preferable that the sublayer number NML be larger. In the case where the productivity is higher for a smaller sublayer number NML, the sublayer number NML is appropriately selected from the viewpoint of both the achieved characteristics and productivity.

In the following, the characteristics of an alternative mirror 130 are described. The mirror 130 is different from the mirror 120 in the first thickness d1 of the first film L1 and the second thickness d2 of the second film L2.

Figure 10A:
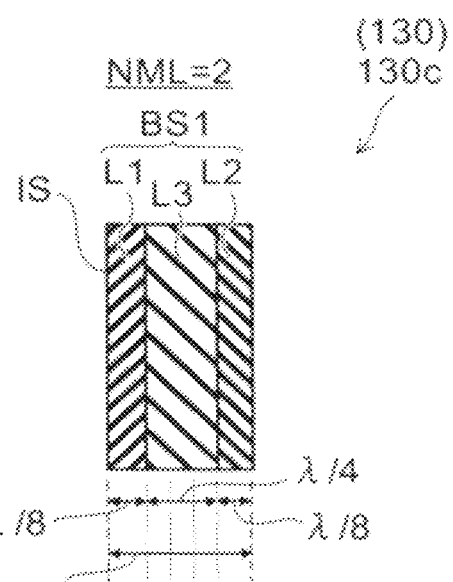
FIG. 10A and FIG. 10B are schematic views showing the configuration of a mirror.
Figure 10B:
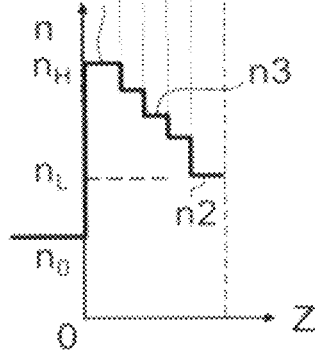

FIG. 10A and FIG. 10B are schematic views illustrating the configuration of the mirror.

More specifically, FIG. 10A is a schematic sectional view of the mirror 130. FIG. 10B is a graph illustrating the characteristics of the mirror 130. The horizontal axis represents position, and the vertical axis represents refractive index n.

As shown in FIG. 10B, also in the mirror 130, the third film L3 includes sublayers. The third refractive index n3 of the third film L3 is changed (gradually decreased) in steps of the sublayer number NML. That is, the third film L3 includes NML sublayers stacked.

In the mirror 130, the first thickness d1 of the first film L1 and the second thickness d2 of the second film L2 are λ/8, and the third thickness d3 of the third film L3 is λ/4. That is, the mirror 130 has the boundary characteristics of the condition for the mirror according to the embodiment, i.e., the condition that "the first thickness d1 of the first film L1 is larger than λ/8 and smaller than λ/4, and the second thickness d2 of the second film L2 is larger than λ/8 and smaller than λ/4".

The thickness of each sublayer included in the third film L3 is d3/NML=λ/(4·NML).

In the mirror 130c illustrated in FIG. 10A and FIG. 10B, the sublayer number NML is 3, and the thickness of each sublayer included in the third film L3 is λ/12.

FIG. 11A, FIG. 11B, FIG. 11C, and FIG. 11D are schematic views illustrating the configuration of mirrors of a comparative example.

More specifically, FIG. 11A is a schematic sectional view of a mirror 130b of the comparative example. FIG. 11B is a graph illustrating the characteristics of the mirror 130b. The horizontal axis represents position, and the vertical axis represents refractive index n. FIG. 11C is a schematic sectional view of a mirror 138 of the comparative example. FIG. 11D is a graph illustrating the characteristics of the mirror 138. The horizontal axis represents position, and the vertical axis represents refractive index n.

As shown in FIG. 11A and FIG. 11B, in the mirror 130b, the first thickness d1 of the first film L1 and the second thickness d2 of the second film L2 are λ/8, and the third thickness d3 of the third film L3 is λ/4. The sublayer number NML is 2, and the thickness of each sublayer included in the third film L3 is λ/8. Hence, the thicknesses of the first film L1, the second film L2, and the sublayer included in the third film L3 are λ/8, being equal to each other. That is, in the mirror 130b, in the triple-layer structural body BS, the refractive index is changed at equal spacings. The configuration of the mirror 130b coincides with the configuration of the mirror 129b, which corresponds to the mirror 120 of the fourth comparative example with NML being 2 (i.e., k being 4). Thus, the configuration of the mirror 130b is regarded as a comparative example.

As shown in FIG. 11C and FIG. 11D, also in the mirror 138, the first thickness d1 of the first film L1 and the second thickness d2 of the second film L2 are λ/8, and the third thickness d3 of the third film L3 is λ/4. The sublayer number NML is 1.

Figure 12:
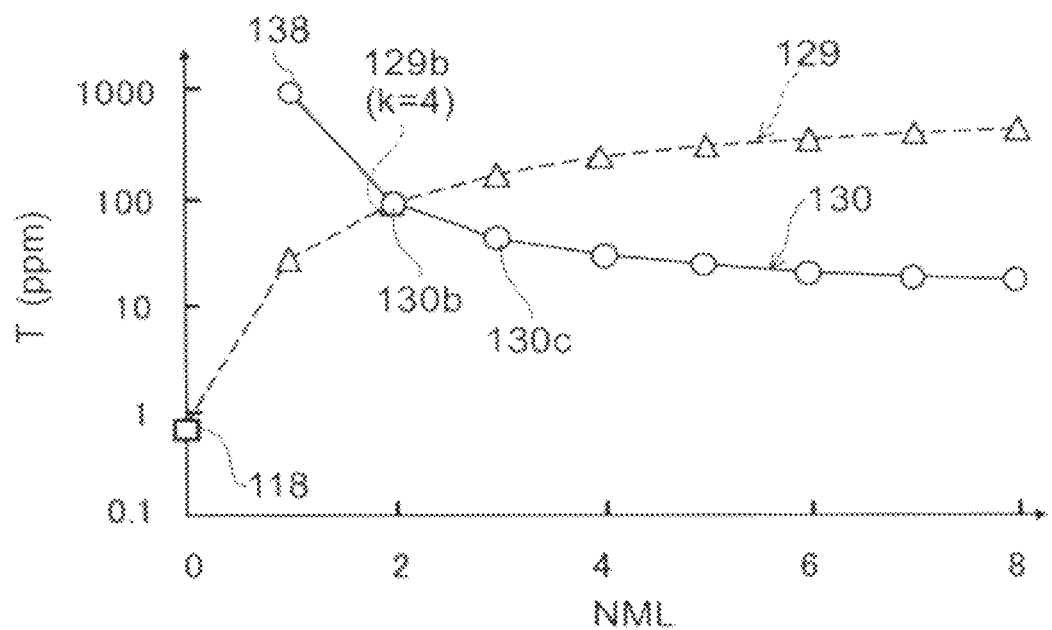
FIG. 12 is a graph showing the characteristics of the mirrors.

FIG. 12 is a graph illustrating the characteristics of the mirrors.

More specifically, FIG. 12 illustrates the relationship between the transmittance T and the sublayer number NML of the mirror. The horizontal axis represents the sublayer number NML, and the vertical axis represents the transmittance T. Here, the vertical axis is presented in a logarithmic scale.

The solid line in this figure corresponds to the characteristics of the mirror 130 (including the mirror 130c) and the mirrors 130b and 138 of the comparative example. In this figure, the characteristics of the mirror 129 (having a refractive index changing at equal spacings along the thickness direction) of the fourth comparative example illustrated in FIG. 9B are shown by the dashed line.

As shown in FIG. 12, in the configuration of the mirror 130 (solid line), the transmittance T decreases with the increase of the sublayer number NML. Here, the transmittance T of the mirror 138 with the sublayer number NML being 1 is significantly high.

As described above, in the mirror 129 (dashed line), the transmittance T increases with the increase of the sublayer number NML.

The configuration of the mirror 130b corresponding to the configuration of the mirror 130 with the sublayer number NML being 2 is identical to the configuration of the mirror 129b corresponding to the configuration of the mirror 129 with the sublayer number NML being 2. Thus, these mirrors have an equal transmittance T.

In the configuration of the mirror 130, when the sublayer number NML is 3 or more, the transmittance T is lower than that of the mirror 129 of the fourth comparative example. Thus, the transmittance T of the mirror 130 with the sublayer number NML being 3 or more can be made lower than that in the fourth comparative example.

In the configuration of the mirror 130 described above, the first thickness d1 of the first film L1 and the second thickness d2 of the second film L2 are set to λ/8, and the third thickness d3 of the third film L3 is set to λ/4. However, under the condition that the first thickness d1 of the first film L1 is larger than λ/8 and smaller than λ/4, and the second thickness d2 of the second film L2 is larger than λ/8 and smaller than λ/4 (the condition of the embodiment), the transmittance T can be made lower than that of the mirror 129b of the comparative example even in the case where the sublayer number NML is 2. Hence, if this condition is adopted, the transmittance can be made lower than that in the comparative example in the case where the sublayer number NML is 2 or more.

Thus, in the embodiment, the sublayer number NML only needs to be 2 or more under the condition that the first thickness d1 of the first dielectric thin film L1 is larger than λ/8 and smaller than λ/4, and the second thickness d2 of the second dielectric thin film L2 is larger than λ/8 and smaller than λ/4. That is, the third refractive index n3 of the third dielectric thin film L3 only needs to gradually decrease from the first dielectric thin film L1 toward the second dielectric thin film L2.

In the following, examples of the mirror and its manufacturing method according to the embodiment are described.

In the mirror 110 according to the embodiment, the film L(3j-2) having a high refractive index (such as first film L1 and fourth film L4) can be made of e.g. $Ta_2O_5$ (the refractive index is approximately 2.1). The film L(3j-1) having a low refractive index (such as second film L2 and fifth film L5) can be made of e.g. $SiO_2$ (the refractive index is approximately 1.46). The film L(3j) (such as third film L3 and sixth film L6) having a gradually decreasing refractive index can be made of e.g. a composite film including these materials. However, the material used for each layer of the triple-layer structural body BS is arbitrary, and can be variously modified. Furthermore, the plurality of triple-layer structural bodies BS may be different from each other in material and configuration.

The substrate SB can be e.g. a fused quartz substrate polished sufficiently smoothly. On the major surface of such a substrate SB, the triple-layer structural body BS is formed by e.g. the ion beam sputtering method or evaporation method.

In the double-layer structural body SF, the layer having a high refractive index (such as first high refractive index film HF1) can be made of e.g. $Ta_2O_5$. The layer having a low refractive index (such as first low refractive index film LF1) can be made of e.g. $SiO_2$. However, the material used for each layer of the double-layer structural body SF is arbitrary, and can be variously modified. Furthermore, the plurality of double-layer structural bodies SF may be different from each other in material and configuration.

In the mirror 110 according to the embodiment, in the case where the double-layer structural body SF is used, the double-layer structural body SF (e.g., a plurality of double-layer structural bodies SF) is formed on the major surface of the substrate SB, and the triple-layer structural body BS (e.g., a plurality of triple-layer structural bodies BS) is formed on the double-layer structural body SF. The double-layer structural body SF is also formed by e.g. the ion beam sputtering method or evaporation method.

The third in film L3 can be made of a composite of the material having a first refractive index n1 used for the first film L1 and the material having a second refractive index n2 used for the second film L2. By changing the ratio of these materials in this composite, the third refractive index n3 of the third film L3 can be changed (gradually decreased).

For instance, the first film L1 can be made of $TiO_2$ (the refractive index is approximately 2.4), and the second film L2 can be made of $SiO_2$ (the refractive index is approximately 1.46). In this case, the third film L3 can be formed from a mixture of these materials.

For instance, the mirror 110 illustrated in FIG. 1A to FIG. 1C is configured so that the third refractive index n3 of the film L(3j) having a gradually decreasing refractive index continuously changes along the Z-axis direction. To fabricate such a configuration, for instance, the coevaporation method using materials having different refractive indices can be adopted.

For instance, to form the third film L3, the coevaporation method using $TiO_2$ and $SiO_2$ can be adopted. Based on the ratio of $TiO_2$ and $SiO_2$, an arbitrary refractive index of 1.46 or more and 2.4 or less can be obtained. Thus, by continuously changing the ratio, a continuously changing refractive index is obtained.

In the case of using e.g. the ion beam sputtering method, for instance, a plurality of dielectric material targets having different refractive indices fabricated by the method such as coevaporation can be used. Film formation can be performed using such a plurality of targets, and the refractive index can be changed stepwise. Thus, a plurality of sublayers having different refractive indices can be provided in the film L(3j) of dielectric having a gradually decreasing refractive index. Furthermore, by sufficiently increasing the sublayer number NML, the refractive index can be changed approximately continuously.

FIG. 13A to FIG. 13F are schematic views illustrating the configuration of the mirror according to the embodiment.

Figure 13A:
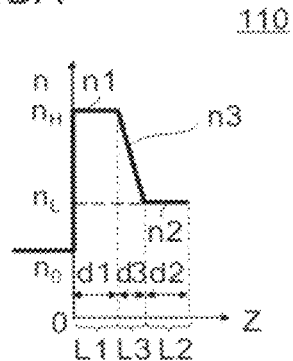
FIG. 13A to FIG. 13F are schematic views showing the mirrors.
Figure 13D:
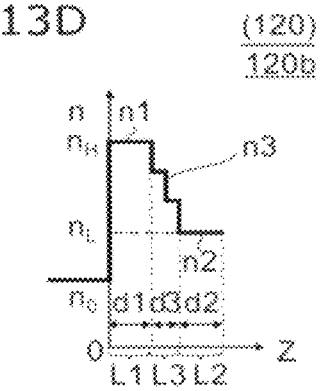
Figure 13B:
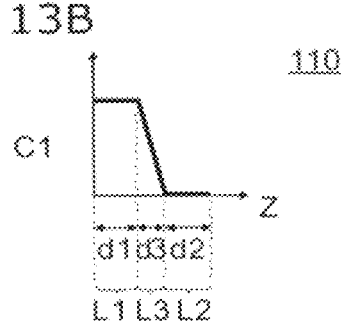
Figure 13E:
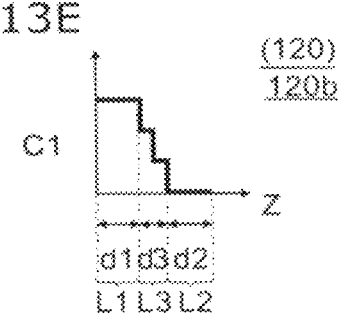
Figure 13C:
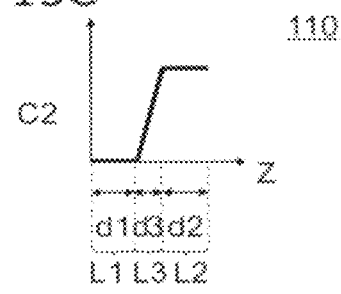
Figure 13F:
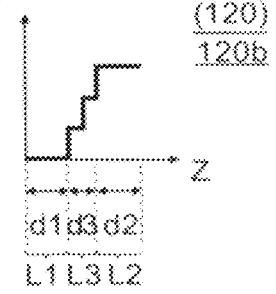

More specifically, FIG. 13A, FIG. 13B, and FIG. 13C are graphs illustrating the characteristics of the mirror 110. The horizontal axis represents position. The vertical axis of FIG. 13A represents refractive index n. The vertical axis of FIG. 13B represents the content ratio C1 (arbitrary scale) of an element E1 in the triple-layer structural body BS. The vertical axis of FIG. 13C represents the content ratio C2 (arbitrary scale) of a different element E2 in the triple-layer structural body BS. FIG. 13D, FIG. 13E, and FIG. 13F are graphs illustrating the characteristics of the mirror 120 (specifically, the mirror 120b). The horizontal axis represents position. The vertical axis of FIG. 13D represents refractive index n. The vertical axis of FIG. 13E represents the content ratio C1 (arbitrary scale) of the element E1 in the triple-layer structural body BS. The vertical axis of FIG. 13F represents the content ratio C2 (arbitrary scale) of the different element E2 in the triple-layer structural body BS.

In the specific example, the first film L1 is made of a first material (e.g., $TiO_2$). The second film L2 is made of a second material (e.g., $SiO_2$). The third film L3 is made of a composite of the first material and the second material. By changing the ratio of the first material and the second material, the third refractive index n3 of the third film L3 is changed (gradually decreased).

For instance, the element E1 is set to Ti, and the content ratio C1 is set to the content ratio of Ti. The element E2 is set to Si, and the content ratio C2 is set to the content ratio of Si.

As shown in FIG. 13A and FIG. 13B, in accordance with the intended refractive index change in the triple-layer structural body BS, the content ratio C1 of the element E1 included in each layer in the triple-layer structural body BS is changed. More specifically, in the first film L1, the content ratio C1 of the element E1 is high. In the second film L2, the content ratio C1 of the element E1 is low. In the third film L3, the content ratio C1 of the element E1 is gradually decreased along the direction from the first film L1 toward the second film L2.

As shown in FIG. 13A and FIG. 13C, in accordance with the intended refractive index change in the triple-layer structural body BS, the content ratio C2 of the element E2 included in each layer in the triple-layer structural body BS is changed. More specifically, in the first film L1, the content ratio C2 of the element E2 is low. In the second film L2, the content ratio C2 of the element E2 is high. In the third film L3, the content ratio C2 of the element E2 is gradually decreased along the direction from the second film L2 toward the first film L1.

The mirror 110 illustrated in FIG. 13A, FIG. 13B, and FIG. 13C is an example in which the third refractive index n3 of the third film L3 continuously, smoothly, and gradually decreases. In this example, corresponding to the change of the third refractive index n3, the content ratio C1 of the element E1 and the content ratio C2 of the element E2 are continuously and smoothly changed.

Alternatively, as shown in FIG. 13D, FIG. 13E, and FIG. 13F, the third refractive index n3 of the third film L3 can gradually decrease stepwise. Also in this case, in accordance with the refractive index change of the triple-layer structural body BS, the content ratio C1 of the element E1 and the content ratio C2 of the element E2 included in each layer in the triple-layer structural body BS are changed.

Thus, in the mirror according to the embodiment, the first film L1 includes a first element (e.g., element E1). The concentration (content ratio C1) of the first element included in the third film L3 decreases along the direction from the first film L1 toward the second film L2. Furthermore, the second film L2 includes a second element (e.g., element E2) different from the first element. The concentration (content ratio C2) of the second element included in the third film L3 decreases along the direction from the second film L2 toward the first film L1.

Alternatively, the third film L3 may include a material different from at least one of the material having a first refractive index n1 used for the first film L1 and the material having a second refractive index n2 used for the second film L2.

For instance, the first film L1 is made of a first material. The second film L2 is made of a second material. The third film L3 is made of a composite of the first material and a third material. By changing the ratio of the first material and the third material, the third refractive index n3 of the third film L3 can be changed (gradually decreased). Alternatively, for instance, the first film L1 is made of a first material. The second dielectric thin film L2 is made of a second material. The third film L3 is made of a composite of the second material and a third material. By changing the ratio of the second material and the third material, the third refractive index n3 of the third film L3 can be changed (gradually decreased). Alternatively, for instance, the first film L1 is made of a first material. The second film L2 is made of a second material. The third film L3 is made of a composite of the first material, the second material, and a third material. By changing the ratio of the first material, the second material, and the third material, the third refractive index n3 of the third film L3 can be changed (gradually decreased).

In this case, at least one of the following occurs: the first film L1 includes a first element (e.g., element E1), and the concentration (content ratio C1) of the first element included in the third film L3 decreases along the direction from the first film L1 toward the second film L2; and the second film L2 includes a second element (e.g., element E2), and the concentration (content ratio C2) of the second element included in the third film L3 decreases along the direction from the second film L2 toward the first film L1.

Still alternatively, the first film L1 is made of a first material. The second film L2 is made of a second material. The third film L3 is made of a composite of a third material and a fourth material. By changing the ratio of the third material and the fourth material, the third refractive index n3 of the third film L3 can be changed (gradually decreased).

As described above, in the mirror according to the embodiment, the third film L3 can be fabricated by e.g. the vapor phase film formation method using the material included in the first film L1 and the material included in the second film L2. Furthermore, the third film L3 can be fabricated by e.g. the vapor phase film formation method using a target including the material included in the first film L1 and the material included in the second film L2.

Furthermore, the third film L3 can be made of a material different from the first film L1 and the second film L2. That is, the first film L1 includes a first element, the second film L2 includes a second element, and the third film L3 can include a third element different from the first element and different from the second element.

Furthermore, the third film L3 can be fabricated by e.g. the vapor phase film formation method using a material different from the material included in the first film L1 and the material included in the second film L2. In particular, in the case where the refractive index changes stepwise in the third film L3, each sublayer having a constant refractive index can be fabricated using a different material.

For instance, the third film L3 can be based on the configuration of stacking a plurality of sublayers made of different materials and having different refractive indices. More specifically, the third film L3 can include a first sublayer including a dielectric including the aforementioned third element, and a second sublayer stacked with the first sublayer in the first direction and including a dielectric including a fourth element different from the first element, different from the second element, and different from the third element.

Thus, the configuration of the first film L1, the second film L2, and the third dielectric thin film L3 can be variously modified.

At least one of the first film L1, the second film L2, and the third film L3 can be made of e.g. various oxides such as $SiO_2$ (refractive index=1.46), $Al_2O_3$ (refractive index=1.63), $Yb_2O_3$ (refractive index=1.75), $Y_2O_3$ (refractive index=1.79), $Sc_2O_3$ (refractive index=1.86), $Gd_2O_3$ (refractive index=1.92), $La_2O_3$ (refractive index=1.95), $Nd_2O_3$ (refractive index=$^2$), $Ta_2O_5$ (refractive index=2.1), and $TiO_2$ (refractive index=2.4), and e.g. fluorides such as $LaF_3$ (refractive index=1.59).

Furthermore, the first sublayer and the second sublayer described above can be made of one of the aforementioned materials.

Figure 14A:
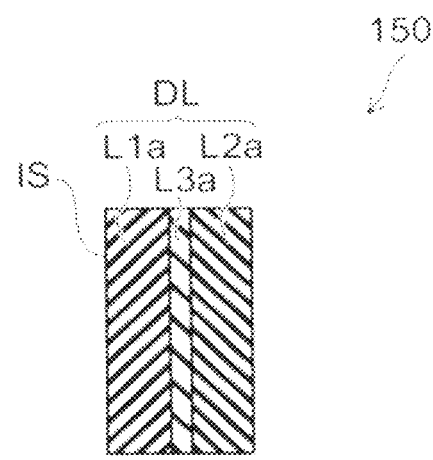
FIG. 14A and FIG. 14B are schematic views showing a mirror.
Figure 14B:
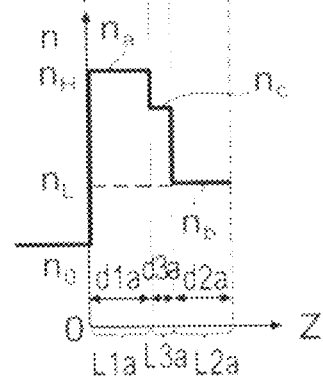

FIG. 14A and FIG. 14B are schematic views illustrating the configuration of an alternative mirror according to the embodiment.

More specifically, FIG. 14A is a schematic sectional view of the alternative mirror 150 according to the embodiment. FIG. 14B is a graph illustrating the characteristics of the mirror 150. The horizontal axis represents position, and the vertical axis represents refractive index n.

As shown in FIG. 14A and FIG. 14B, one of the plurality of dielectric layers DL illustrated in FIGS. 1A to 1C includes a first side face film L1a of dielectric, a second side face film L2a of dielectric, and a center film L3a of dielectric.

The first side face film L1a has a thickness d1a larger than ⅙ of the design wavelength and smaller than ¼ of the design wavelength. The first side face film L1a has a first side face refractive index $n_a$ (e.g., high refractive index $n_H$).

The second side face film L2a is stacked with the first side face film L1a in the first direction, and has a thickness d2a larger than ⅙ of the design wavelength and smaller than ¼ of the design wavelength. The second side face film L2a has a second side face refractive index $n_b$ (e.g., low refractive index $n_L$) lower than the first side face refractive index $n_a$.

The center film L3a is provided between the first side face film L1a and the second side face film L2a. The center film L3a has a thickness d3a. The thickness d3a is obtained by subtracting the sum of the thickness d1a of the first side face film L1a and the thickness d2a of the second side face film L2a from the value of half the design wavelength. The refractive index of the center film L3a is lower than the first side face refractive index $n_a$ and higher than the second side face refractive index $n_b$.

Thus, the thickness d3a of the center film L3a is thinner than λ/6 and thinner than the thickness d1a of the first side face film L1a and the thickness d2a of the second side face film L2a. From the first side face film L1a through this center film L3a toward the second side face film L2a, the refractive index gradually decreases from the first side face refractive index $n_a$ to the second side face refractive index $n_b$. Accordingly, as described above, the refractive index is gradually decreased in the region of thigh electric field EF, and the refractive index is discontinuously increased in the region where the electric field EF is substantially zero. Thus, the interface scattering loss can be suppressed.

The mirror 150 thus configured can also provide a low-loss high-reflection mirror.

Here, a plurality of dielectric layers DL can be configured to include the first side face film L1a, the second side face film L2a, and the center dielectric thin film L3a as described above.

The dielectric layer DL including the first side face film L1a, the second side face film L2a, and the center film L3a can be placed at the end on the incident surface IS side in the plurality of dielectric layers DL. More specifically, the dielectric layer DL including the first side face film L1a, the second side face film L2a, and the center film L3a described above is placed at one end of the plurality of dielectric layers DL. The second side face film is placed between the center film and the plurality of dielectric layers DL except the dielectric layer DL including the first side face film L1a, the second side face film L2a, and the center film L3a. This provides lower loss and higher reflection.

The first side face film L1a, the second side face film L2a, and the center film L3a can be based on at least one of the materials and manufacturing methods described with reference to the first film L1, the second film L2, and the third film L3.

The mirror according to the embodiment is applicable to e.g. an ultraprecision interferometer, optical gyro device, optical spectrum analyzer, optical frequency standard device, and quantum computer.

The ultraprecision interferometer includes e.g. a gravitational wave detector for measuring e.g. the distance by interference of light. In this ultraprecision interferometer, a resonator is used to improve the precision. If the mirror of this resonator has higher reflection and lower loss, the precision can be improved. The optical gyro device is e.g. an angular velocity detector, installed on e.g. airplanes and rockets. The optical gyro device includes a ring resonator using a mirror. If this mirror has higher reflection and lower loss, the precision can be improved. The optical spectrum analyzer is used to measure the frequency and spectrum of light. In the optical spectrum analyzer, a mirror is used for the narrow band optical bandpass filter. If this mirror has higher reflection and lower loss, the resolution is improved. The optical frequency standard device is used as a frequency (time) standard based on light, and requires a high-performance optical resonator as an ultra narrow band laser. If the mirror of the optical resonator has higher reflection and lower loss, the precision can be improved.

Figure 15:
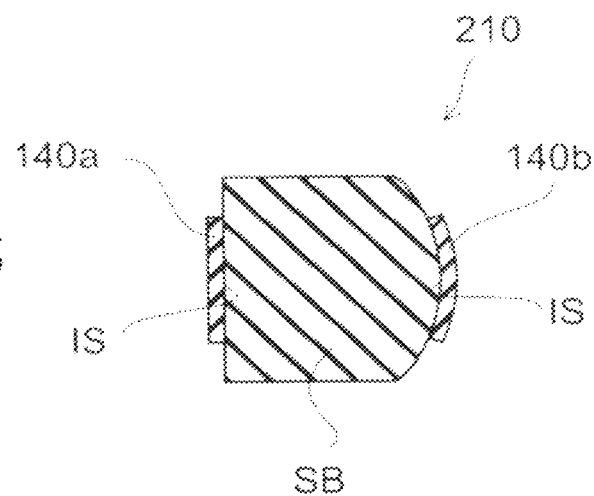
FIG. 15 is a schematic view showing an optical device using mirrors.

FIG. 15 is a schematic view illustrating the configuration of an optical device using the mirror according to the embodiment.

More specifically, FIG. 15 illustrates the configuration of a resonator 210 using the mirror according to the embodiment.

As shown in FIG. 15, in the resonator 210, the mirror according to the embodiment is provided on a substrate body SB made of e.g. an EIT (electromagnetically induced transparency) crystal. In the specific example, one surface of the substrate body SB made of a bulk dielectric is planar, and the other surface is curved. A mirror 140a is provided on the planar side of the substrate body SB, and a mirror 140b is provided on the curved side. In the mirror 140a and the mirror 140b, the incident surface IS is located on the substrate body SB side. Such a resonator 210 is provided in a quantum computer. Realization of such a quantum computer requires a high-reflection low-loss resonator mirror. The mirror according to the embodiment can be applied to these purposes to achieve performance significantly higher than conventional.

The embodiment of the invention has been described above with reference to examples. However, the invention is not limited to these examples. For instance, any specific configuration of the component included in the mirror such as the triple-layer structural body, double-layer structural body, film, dielectric film, and substrate can be variously modified in shape, size, material, and layout by those skilled in the art. Such modifications are also encompassed within the scope of the invention as long as those skilled in the art can similarly practice the invention and achieve similar effects by suitably selecting such configuration from conventionally known ones.

Further, any two or more components of the specific examples may be combined within the extent of technical feasibility and are included in the scope of the invention to the extent that the spirit of the invention is included.

Furthermore, those skilled in the art can suitably modify and implement the mirror described above in the embodiment of the invention. All the mirrors thus modified are also encompassed within the scope of the invention as long as they fall within the spirit of the invention.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A mirror, comprising:
    a plurality of dielectric layers stacked in a first direction, a thickness along the first direction of each of the dielectric layers being a length of half a design wavelength,
    the dielectric layers including: a first dielectric layer,
    the first dielectric layer including:
        a first portion having a first portion refractive index, a thickness of the first portion along the first direction being $1/8$ of the design wavelength;
        a second portion stacked with the first portion in the first direction, the second portion having a second portion refractive index lower than the first portion refractive index, a thickness of the second portion along the first direction being $1/8$ of the design wavelength; and
        a third portion provided between the first portion and the second portion, the third portion having a third portion refractive index gradually decreasing from a side of the first portion toward a side of the second portion, a thickness of the third portion along the first direction being $1/4$ of the design wavelength, and
    a variance of the third portion refractive index with respect to the first direction being larger than a variance of the first portion refractive index with respect to the first direction and being larger than a variance of the second portion refractive index with respect to the first direction,
    wherein
    the first dielectric layer includes a first triple-layer structural body, and
    the first triple-layer structural body includes:
        a first film of dielectric having a first thickness larger than $1/8$ of the design wavelength and smaller than $1/4$ of the design wavelength, and having a first refractive index;
        a second film of dielectric stacked with the first film in the first direction, having a second thickness larger than $1/8$ of the design wavelength and smaller than $1/4$ of the design wavelength, and having a second refractive index lower than the first refractive index; and
        a third film of dielectric provided between the first film and the second film, the third film having a third thickness which is obtained by subtracting sum of the first thickness and the second thickness from a value of half the design wavelength, and the third film having a third refractive index gradually decreasing from a side of the first film toward a side of the second film.

2. The mirror according to claim 1, wherein at least one of the first film, the second film and the third film includes an oxide including at least one of Si, Al, Yb, Y, Sc, Gd, La, N, Ta and Ti.

3. The mirror according to claim 1, wherein at least one of the first film, the second film and the third film includes a fluoride of La.

4. The mirror according to claim 1, wherein the first dielectric layer is disposed at one end of the dielectric layers.

5. The mirror according to claim 4, wherein
    the dielectric layers include a second dielectric layer different from the first dielectric layer,
    the second dielectric layer includes a second triple-layer structural body, and
    the second triple-layer structural body includes a fourth film of dielectric, a fifth film of dielectric and a sixth film of dielectric,
    the second film is disposed between the first film and the fifth film,
    the fourth film is disposed between the second film and the fifth film,
    the sixth film is disposed between the fourth film and the fifth film,
    the fourth film has a fourth thickness larger than $1/8$ of the design wavelength and smaller than $1/4$ of the design wavelength, and has a fourth refractive index;
    the fifth film has a fifth thickness larger than $1/8$ of the design wavelength and smaller than $1/4$ of the design wavelength, and has a fifth refractive index lower than the fourth refractive index; and
    the sixth film has a sixth thickness which is obtained by subtracting sum of the fourth thickness and the fifth thickness from half the design wavelength, and has a sixth refractive index gradually decreasing from a side of the fourth film toward a side of the fifth film.

6. The mirror according to claim 5, wherein
    the dielectric layers include a fourth dielectric layer different from the first dielectric layer and the second dielectric layer,
    the fourth dielectric layer includes a first double-layer structural body,
    the second triple-layer structural body is disposed between the first triple-layer structural body and the first double-layer structural body,
    the first double-layer structural body includes a first high refractive index film of dielectric and a first low refractive index film of dielectric, the fifth film is disposed between the fourth film and the first low refractive index film, the first high refractive index film is disposed between the fifth film and the first low refractive index film, the first high refractive index film has a thickness of ¼ of the design wavelength, and the first low refractive index film has a thickness of ¼ of the design wavelength, and has a refractive index lower than a refractive index of the first high refractive index film.

7. The mirror according to claim 6, wherein the dielectric layers include a fifth dielectric layer different from the first dielectric layer, the second dielectric layer and the fourth dielectric layer, the fourth dielectric layer is disposed between the second dielectric layer and the fifth dielectric layer, the fifth dielectric layer includes a second double-layer structural body, the second double-layer structural body includes a second high refractive index film of dielectric and a second low refractive index film of dielectric, the first low refractive index film is disposed between the first high refractive index film and the second low refractive index film, the second high refractive index film is disposed between the first low refractive index film and the second low refractive index film, the second high refractive index film has a thickness of ¼ of the design wavelength, and the second low refractive index film has a thickness of ¼ of the design wavelength, and has a refractive index lower than a refractive index of the second high refractive index film.

8. The mirror according to claim 4, wherein the dielectric layers includes a third dielectric layer different from the first dielectric layer, the third dielectric layer includes a first double-layer structural body, and the first double-layer structural body includes a first high refractive index film of dielectric and a first low refractive index film of dielectric, the second film is disposed between the first film and the first low refractive index film, the first high refractive index film is disposed between the second film and the first low refractive index film, the first high refractive index film has a thickness of ¼ of the design wavelength, and the first low refractive index film has a thickness of ¼ of the design wavelength, and has a refractive index lower than a refractive index of the first high refractive index film.

9. The mirror according to claim 8, wherein the first high refractive index film includes O (Oxygen) and at least one of Ta and Ti, and the first low refractive index film includes O (Oxygen) and Si.

10. The mirror according to claim 1, wherein the third refractive index is linearly and gradually decreased from a side of the first film toward a side of the second film.

11. The mirror according to claim 1, wherein a rate of change of the third refractive index of the third film in a center portion in a second direction from the side of the first film toward the side of the second film is larger than a rate of change of the third refractive index of the third film in an end portion in the second direction, the rate of change being along the second direction.

12. The mirror according to claim 1, wherein a rate of change of the third refractive index of the third film in a center portion in a second direction from the side of the first film toward the side of the second film is smaller than a rate of change of the third refractive index of the third film in an end portion in the second direction, the rate of change being along the second direction.

13. The mirror according to claim 1, wherein at least one of the first refractive index and the second refractive index changes along a second direction from the side of the first film toward the side of the second film.

14. The mirror according to claim 13, wherein a rate of change of the at least one of the first refractive index and the second refractive index along the second direction is smaller than a rate of change of the third refractive index along the second direction.

15. The mirror according to claim 1, wherein the first film includes a first element, and a concentration of the first element included in the third film decreases along a direction from the first film toward the second film.

16. The mirror according to claim 1, wherein the first film includes a first element, the second film includes a second element different from the first element, and a concentration of the second element in the third film decreases along a direction from the second film toward the first film.

17. The mirror according to claim 16, wherein the third film includes:

a first sublayer of dielectric including a third element; and a second sublayer of dielectric stacked with the first sublayer in the first direction and including a fourth element different from the first element, different from the second element, and different from the third element.

18. The mirror according to claim 1, wherein the design wavelength is not less than 370 nanometers and not more than 1000 nanometers.

19. A mirror, comprising:

a plurality of dielectric layers stacked in a first direction, a thickness along the first direction of each of the dielectric layers being a length of half a design wavelength, the dielectric layers including: a first dielectric layer, the first dielectric layer including:

a first portion having a first portion refractive index, a thickness of the first portion along the first direction being ⅛ of the design wavelength;

a second portion stacked with the first portion in the first direction, the second portion having a second portion refractive index lower than the first portion refractive index, a thickness of the second portion along the first direction being ⅛ of the design wavelength; and a third portion provided between the first portion and the second portion, the third portion having a third portion refractive index gradually decreasing from a side of the first portion toward a side of the second portion, a thickness of the third portion along the first direction being ¼ of the design wavelength, and a variance of the third portion refractive index with respect to the first direction being larger than a variance of the first portion refractive index with respect to the first direction and being larger than a variance of the second portion refractive index with respect to the first direction, wherein the first dielectric layer includes:

a first side face film having a thickness larger than ⅙ of the design wavelength and smaller than ¼ of the design wavelength, and having a first side face refractive index, a second side face film stacked with the first side face film in the first direction, having a thickness larger than ⅙ of the design wavelength and smaller than ¼ of the design wavelength, and having a second side face refractive index lower than the first side face refractive index, and a center film provided between the first side face film and the second side face film, having a thickness which is obtained by subtracting sum of the thickness of the first side face film and the thickness of the second side face film from a value of half the design wavelength, and having a refractive index lower than the first side face refractive index and higher than the second side face refractive index.

20. A mirror, comprising:

a plurality of dielectric layers stacked in a first direction, a thickness along the first direction of each of the dielectric layers being a length of half a design wavelength, the dielectric layers including: a first dielectric layer, the first dielectric layer including:

a first portion having a first portion refractive index, a thickness of the first portion along the first direction being ⅛ of the design wavelength;

a second portion stacked with the first portion in the first direction, the second portion having a second portion refractive index lower than the first portion refractive index, a thickness of the second portion along the first direction being ⅛ of the design wavelength; and a third portion provided between the first portion and the second portion, the third portion having a third portion refractive index gradually decreasing from a side of the first portion toward a side of the second portion, a thickness of the third portion along the first direction being ¼ of the design wavelength, and a variance of the third portion refractive index with respect to the first direction being larger than a variance of the first portion refractive index with respect to the first direction and being larger than a variance of the second portion refractive index with respect to the first direction, wherein the first dielectric layer includes a first triple-layer structural body, and the first triple-layer structural body includes:

a first film of dielectric having a first thickness larger than ⅛ of the design wavelength and smaller than ¼ of the design wavelength, and having a first refractive index;

a second film of dielectric stacked with the first film in the first direction, having a second thickness larger than ⅛ of the design wavelength and smaller than ¼ of the design wavelength, and having a second refractive index lower than the first refractive index; and a third film of dielectric provided between the first film and the second film, the third film having a third thickness which is obtained by subtracting sum of the first thickness and the second thickness from a value of half the design wavelength, and the third film having a third refractive index gradually decreasing from a side of the first film toward a side of the second film, the third film includes:

a first sublayer of dielectric including a third element; and a second sublayer of dielectric stacked with the first sublayer in the first direction.

21. The mirror according to claim 20, wherein the second sublayer has a refractive index different from a refractive index of the first sublayer.

\* \* \* \* \*